(12) United States Patent
Yin et al.

(10) Patent No.: US 8,743,812 B2
(45) Date of Patent: Jun. 3, 2014

(54) METHOD, SYSTEM, AND ACCESS GATEWAY FOR TRAFFIC FLOWS TO SHARE RESOURCES

(75) Inventors: Yu Yin, Shanghai (CN); Qing Zhou, Berlin (DE)

(73) Assignee: Huawei Technologies Co., Ltd., Shenzhen (CN)

(*) Notice: Subject to any disclaimer, the term of this patent is extended or adjusted under 35 U.S.C. 154(b) by 137 days.

(21) Appl. No.: 13/401,454

(22) Filed: Feb. 21, 2012

(65) Prior Publication Data

US 2012/0147839 A1 Jun. 14, 2012

Related U.S. Application Data

(63) Continuation of application No. PCT/CN2010/076164, filed on Aug. 20, 2010.

(30) Foreign Application Priority Data

Aug. 21, 2009 (CN) .......................... 2009 1 0091496

(51) Int. Cl.
*H04W 4/00* (2009.01)
(52) U.S. Cl.
USPC ........................ 370/329; 370/252; 370/401
(58) Field of Classification Search
USPC ....................................................... 370/329
See application file for complete search history.

(56) References Cited

U.S. PATENT DOCUMENTS

| 7,453,804 | B1* | 11/2008 | Feroz et al. | 370/230 |
| 8,238,356 | B2* | 8/2012 | Nakamura et al. | 370/401 |
| 8,437,265 | B2* | 5/2013 | Zhi et al. | 370/252 |
| 8,441,995 | B2* | 5/2013 | Xi et al. | 370/329 |
| 2009/0016344 | A1* | 1/2009 | Hu et al. | 370/389 |
| 2009/0129342 | A1* | 5/2009 | Hwang et al. | 370/331 |
| 2009/0225719 | A1 | 9/2009 | Zhi et al. | |
| 2009/0325634 | A1* | 12/2009 | Bienas et al. | 455/552.1 |
| 2010/0165940 | A1* | 7/2010 | Watfa et al. | 370/329 |
| 2011/0007748 | A1* | 1/2011 | Yin et al. | 370/401 |

(Continued)

FOREIGN PATENT DOCUMENTS

| CN | 101047949 A | 10/2007 |
| CN | 101227714 A | 7/2008 |

(Continued)

OTHER PUBLICATIONS

Second Office Action of Chinese Application No. 200910091496.7, mailed Mar. 4, 2013, 12 pages. (Partial Translation).

(Continued)

*Primary Examiner* — Ian N Moore
*Assistant Examiner* — Lakeram Jangbahadur
(74) *Attorney, Agent, or Firm* — Slater & Matsil, L.L.P.

(57) ABSTRACT

Embodiments of the present invention provide a method, a system, and an access gateway for traffic flows to share resources. The method for traffic flows to share resources includes obtaining information of at least two traffic flows and resources requested by the at least two traffic flows, where the at least two traffic flows correspond to different Internet Protocols connections. The at least two traffic flows share the resources. The information of the at least two traffic flows is bound on an established data channel. Resources for the data channel are allocated according to the resources requested by the at least two traffic flows. The at least two traffic flows are beared on the data channel.

18 Claims, 14 Drawing Sheets

(56) References Cited

U.S. PATENT DOCUMENTS

| | | |
|---|---|---|
| 2011/0164566 A1* | 7/2011 | Xiong .......................... 370/328 |
| 2012/0106456 A1* | 5/2012 | Jin et al. ...................... 370/328 |
| 2012/0224564 A1* | 9/2012 | Paisal et al. .................. 370/331 |

FOREIGN PATENT DOCUMENTS

| | | |
|---|---|---|
| CN | 101325805 A | 12/2008 |
| WO | WO 2007/038856 A1 | 4/2007 |
| WO | WO 2009/026761 A1 | 3/2009 |

OTHER PUBLICATIONS

International Search Report received in the Patent Cooperation Treaty Application No. PCT/CN2010/076164, mailed Nov. 25, 2010, 7 pages.

Written Opinion of the International Searching Authority received in Patent Cooperation Treaty Application No. PCT/CN2010/076164, mailed Nov. 25, 2010, 12 pages.

First Chinese Office Action and Partial Translation received in Chinese Application No. 200910091496.7, mailed Jul. 3, 2012, 13 pages.

* cited by examiner

METHOD, SYSTEM, AND ACCESS GATEWAY FOR TRAFFIC FLOWS TO SHARE RESOURCES

CROSS-REFERENCE TO RELATED APPLICATIONS

This application is a continuation of International Application No. PCT/CN2010/076164, filed on Aug. 20, 2010, which claims priority to Chinese Patent Application No. 200910091496.7, filed on Aug. 21, 2009, both of which are hereby incorporated by reference in their entireties.

FIELD OF THE INVENTION

The present invention relates to the field of wireless communications technologies, and in particular, to a method, a system, and an access gateway for traffic flows to share resources.

BACKGROUND OF THE INVENTION

In order to meet challenges from the wireless broadband technologies, and to keep the leading position of the 3rd Generation Partnership Project (The 3rd Generation Partnership Project; 3GPP for short below), the 3GPP formulates the Long Term Evolution (Long Term Evolution; LTE for short below) plan, and defines a new mobile communication network architecture under the guide of the LTE plan. The architecture is flatter than the existing General Packet Radio Service (General Packet Radio Service; GPRS for short below)/Universal Mobile Telecommunication System (Universal Mobile Telecommunication System; UMTS for short below), keeps the packet domain only, and therefore may be called the Evolved Packet System (Evolved Packet System; EPS for short below).

An EPS network includes the Policy Control and Charging (Policy Control and Charging; PCC for short below) architecture, the PCC architecture is used to implement a policy control function of the EPS network.

The EPS network further includes an EPS bearer, which is used in the EPS network to provide resource reservation and Quality of Service (Quality of Service; QoS for short below) assurance. The EPS bearer includes a default bearer and a proprietary bearer. The default bearer is established when a User Equipment (User Equipment; UE for short below) accesses a Packet Data Network (Packet Data Network; PDN for short below), is kept after accessing the PDN, and has an always online Internet Protocol (Internet Protocol; IP for short below) connection function. Except the default bearer, other bearers accessing the PDN are proprietary bearers. Each PDN connection includes a default bearer and 0 to multiple proprietary bearers, and a traffic flow is transferred on an EPS bearer.

The EPS bearer is between a User Equipment (User Equipment; UE for short below) and a Packet Data Network Gateway (Packet Data Network Gateway; PGW for short below). When an S5/S8 interface between a Serving Gateway (Serving Gateway: SGW for short below) and the PGW applies GPRS Tunnel Protocol (GPRS Tunnel Protocol; GTP for short below), the EPS bearer may include a wireless bearer on a wireless network side, an S1 proprietary bearer between a wireless network and a core network, and an S5/S8 bearer between the SGW and the PGW. When the S5/S8 interface between the SGW and the PGW applies the Proxy Mobile IP (Proxy Mobile IP; PMIP for short below), the EPS bearer may include the wireless bearer on the wireless network side and the S1 proprietary bearer between the wireless network and the core network.

In the existing 3GPP specifications, the wireless bearer and the S1 proprietary bearer correspond to a specific PDN connection. That is, a wireless bearer and an S1 proprietary bearer can only correspond to the same IP version 4 (IP version 4; IPv4 for short below)/IP version 6 (IP version 6: IPv6 for short below) address pair. However, when an application of an upper layer performs service migration, for example: a media address with which a User Equipment is performing a session service is changed from an original IP address to a new IP address, and when a traffic flow migrates from an IP address to another IP address, the EPS network has to establish a new wireless bearer and S1 proprietary bearer for the traffic flow on the new IP address, and allocate corresponding resources, thereby causing repeatedly occupation of air interface resources.

SUMMARY OF THE INVENTION

Embodiments of the present invention provide a method, a system, and an access gateway for traffic flows to share resources, so as to enable multiple traffic flows corresponding to different IP connections to share the same data channel, thereby saving air interface resources.

An embodiment of the present invention provides a method for traffic flows to share resources, which includes:

obtaining information of at least two traffic flows and resources requested by the at least two traffic flows, where the at least two traffic flows correspond to different Internet Protocol, IP, connections, and the at least two traffic flows share the resources;

binding the information of the at least two traffic flows on an established data channel, and allocating resources for the data channel according to the resources requested by the at least two traffic flows; and bearing the at least two traffic flows on the data channel.

An embodiment of the present invention further provides an access gateway, which includes:

an obtaining module, configured to obtain information of at least two traffic flows and resources requested by the at least two traffic flows, where the at least two traffic flows correspond to different Internet Protocol, IP, connections, and the at least two traffic flows share the resources;

a binding module, configured to bind the information, which is obtained by the obtaining module, of the at least two traffic flows on the established data channel;

an allocation module, configured to allocate resources for the data channel according to the resources, which are obtained by the obtaining module and requested by the at least two traffic flows; and a bearing module, configured to bear the at least two traffic flows on the data channel.

An embodiment of the present invention further provides a system for traffic flows to share resources, in which the system includes a Policy Charging Rule Function entity and an access gateway, and the Policy Charging Rule Function entity is configured to send a resource request to the access gateway; and the access gateway is configured to receive the resource request sent by the Policy Charging Rule Function entity, and obtain information of at least two traffic flows and resources requested by the at least two traffic flows, where the at least two traffic flows correspond to different Internet Protocol, IP, connections, and the at least two traffic flows share the resources; bind the information of the at least two traffic flows on the established data channel, allocate resources for the data channel according to the resources requested by the at least two traffic flows; and bear the at least two traffic flows on the data channel.

In the embodiments of the present invention, the access gateway obtains the information of the at least two traffic flows and the resources requested by the at least two traffic flows, binds the information of the at least two traffic flows on the established data channel, allocates the resources for the data channel according to the resources requested by the at least two traffic flows, and bears the at least two traffic flows on the data channel. The at least two traffic flows correspond to different IP connections, and share the resources. Therefore, it is achieved that multiple traffic flows corresponding to different IP connections access the same data channel, thereby saving air interface resources.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art may derive other drawings from the accompanying drawings without creative efforts.

DETAILED DESCRIPTION OF THE EMBODIMENTS

The technical solution of the present invention is clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

An embodiment of the present invention provides a method for traffic flows to share resources, in which at least two traffic flows corresponding to different IP connections are borne on the same data channel, so as to avoid occupying air interface resources repeatedly.

Figure 1:
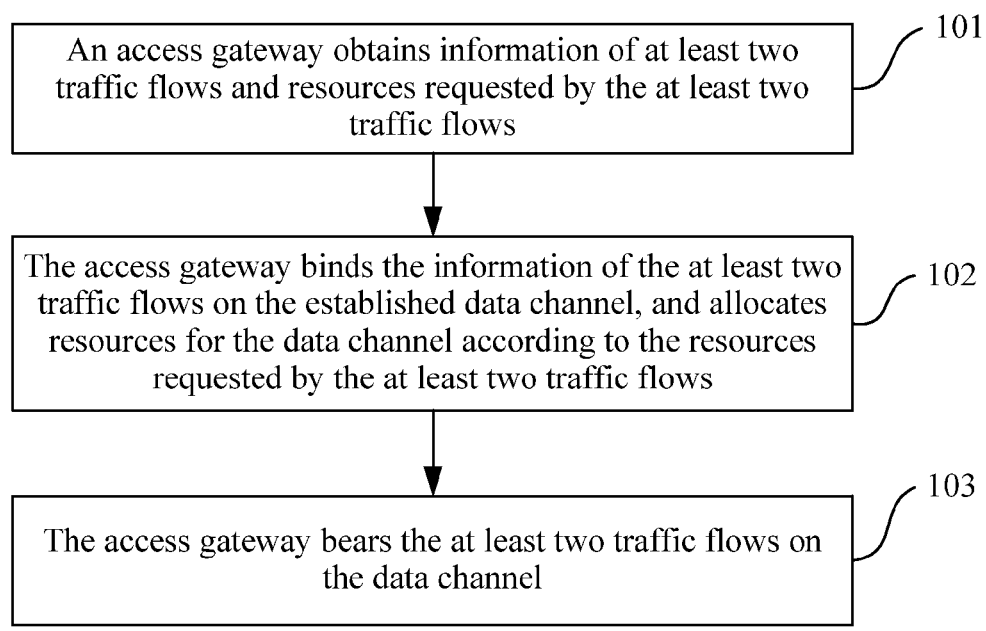
FIG. 1 is a flow chart of an embodiment of a method for traffic flows to share resources according to the present invention.

FIG. 1 is a flow chart of an embodiment of a method for traffic flows to share resources according to the present invention, and as shown in FIG. 1, the embodiment includes:

Step 101: An access gateway obtains information of at least two traffic flows and resources requested by the at least two traffic flows. The at least two traffic flows correspond to different IP connections, and the at least two traffic flows share the resources. The access gateway may be an SGW or an evolved Packet Data Gateway (evolved Packet Data Gateway; ePDG for short below).

The obtaining, by the access gateway, the information of the at least two traffic flows and the resources requested by the at least two traffic flows may specifically include: receiving, by the access gateway, a resource request of a Policy Charging Rule Function (Policy Charging Rule Function; PCRF for short below) entity, where the resource request includes the information of the at least two traffic flows corresponding to different IP addresses of a User Equipment, the resources requested by the at least two traffic flows, and a relationship of the at least two traffic flows sharing the resources.

Alternatively, the access gateway receives a resource request of a PCRF entity. The resource request includes information of a traffic flow of a User Equipment and resources requested by a traffic flow. The access gateway generates the information of the at least two traffic flows corresponding to different IP addresses and the relationship of the at least two traffic flows sharing the resources according to the information of the traffic flow and a recorded relationship of different IP addresses of the User Equipment sharing a data channel; and obtains the resources requested by the at least two traffic flows according to the resources requested by the traffic flow. The resource request of the PCRF entity may be sent to the access gateway by the PCRF entity directly, or sent to the access gateway by the PCRF entity through a Packet Data Gateway.

In the embodiment of the present invention, the sharing the resources by the at least two traffic flows may specifically be: sharing, by PDN connections corresponding to the at least two traffic flows, a wireless bearer and an S1 default bearer; or sharing, by PDN connections corresponding to the at least two traffic flows, an IPSec tunnel.

The sharing, by the PDN connections corresponding to the at least two traffic flows, the wireless bearer and the S1 default bearer may specifically be as follows.

The access gateway receives an additional PDN connection creating request for establishing a second PDN connection, where the additional PDN connection creating request includes an Access Point Name (Access Point Name, APN for short below) and a Linked Bearer Identity (Linked Bearer Identity, LBI for short below) that are used for establishing a first PDN connection, and sends the additional PDN connection creating request for establishing the second PDN connection to a PGW, so that the PGW establishes the second PDN connection according to the additional PDN connection creating request, where the first PDN connection and the second PDN connection share the wireless bearer and the S1 default bearer.

The sharing, by the PDN connections corresponding to the at least two traffic flows, the Internet Protocol Security (Internet Protocol Security; IPSec for short below) tunnel may specifically be as follows. The access gateway receives an IP address re-application request for establishing the second PDN connection, where the IP address re-application request includes an APN used for establishing the first PDN connection; and send a Proxy Binding Update message to the PGW according to the IP address re-application request, so that the PGW establishes the second PDN connection according to the Proxy Binding Update message, where the first PDN connection and the second PDN connection share the IPSec tunnel.

In the embodiment of the present invention, the data channel includes an S1 proprietary bearer or an IPSec tunnel. The resources requested by the traffic flow include a Quality of Service Class Identifier (Quality of Service Class Identifier; QCI for short below) or bandwidth. The information of the traffic flow may specifically be a Traffic Flow Template (Traffic Flow Template; TFT for short below).

Step 102: The access gateway binds the information of the at least two traffic flows on the established data channel, and allocates resources for the data channel according to the resources requested by the at least two traffic flows.

In the embodiment of the present invention, if the information of the at least two traffic flows does not have a corresponding data channel, the access gateway establishes a data channel corresponding to information of any one traffic flow among the at least two traffic flows, and binds the information of the at least two traffic flows on the established data channel.

If information of any one traffic flow among the information of the at least two traffic flows has a corresponding data channel, the access gateway binds the information of the at least two traffic flows on the existing data channel.

Then, the access gateway may deliver a binding relationship between the information of the traffic flow and the established data channel to the User Equipment, so that the User Equipment performs uplink data flow classification. Further, the access gateway may send the resources, which are allocated for the data channel and requested by the information of the traffic flow, to an access network, so that the access network performs resource reservation.

Step 103: The access gateway bears the at least two traffic flows on the data channel.

In the embodiment of the present invention, when the User Equipment initiates service migration to make a traffic flow on an IP address of the User Equipment migrate to another IP address, the PCRF entity may determine, according to a binding relationship of different IP addresses of the User Equipment, that information of the traffic flow corresponding to one IP address and information of the traffic flow corresponding to another IP address share resources, and therefore does not grant additional resources to another IP address.

Further, in an implementation of the embodiment of the present invention, after the service migration of the User Equipment is completed, the access gateway may delete the S1 proprietary bearer on the first PDN connection and the first PDN connection.

The deleting the S1 proprietary bearer on the first PDN connection may specifically be as follows. The access gateway receives a proprietary bearer deletion request; maps information, which is carried in the proprietary bearer deletion request and is of the traffic flow required to be deleted, to the S1 proprietary bearer which is already established; and sends a bearer update request to a Mobility Management Entity, where the bearer update request carries information of an updated traffic flow after the information, of the traffic flow required to be deleted, is deleted, so that the Mobility Management Entity executes a bearer update operation according to the bearer update request, so as to delete the S1 proprietary bearer corresponding to the information of the traffic flow required to be deleted.

The deleting the first PDN connection may specifically be as follows. The access gateway receives an additional PDN connection deletion request. The additional PDN connection deletion request carries the APN and the LBI that are used for establishing the first PDN connection and the IP address required to be deleted. The access gateway deletes the first PDN connection according to the additional PDN connection deletion request.

In another implementation of the embodiment of the present invention, after the service migration of the User Equipment is completed, the access gateway may delete resources reserved for the traffic flow on the first PDN connection and the first PDN connection.

The deleting the resources reserved for the traffic flow on the first PDN connection and the first PDN connection may specifically be as follows. The access gateway receives a session resource request sent by the PCRF entity, where the session resource request includes the information of the traffic flow required to be deleted; maps the information, which is in the session resource request and is of the traffic flow required to be deleted, to the IPSec tunnel, deletes the information of the traffic flow required to be deleted, and sends a session resource response to the PCRF entity.

The deleting the first PDN connection may specifically be as follows. An IP address deletion request is received. The IP address deletion request carries the IP address which is allocated for the User Equipment when the PGW establishes the first PDN connection. Optionally, the IP address deletion request may further carry the APN used for establishing the first PDN connection. The Proxy Binding Update message is sent to the PGW according to the IP address deletion request, so that the PGW deletes the first PDN connection.

In the embodiment, the access gateway obtains the information of the at least two traffic flows and the resources requested by the at least two traffic flows, binds the information of the at least two traffic flows on the established data channel, allocates the resources d to the data channel according to the resources requested by the at least two traffic flows, and bears the at least two traffic flows on the data channel. The at least two traffic flows correspond to different IP connections, and share the resources. Therefore, it is achieved that multiple traffic flows corresponding to different IP connections access the same data channel, thereby saving air interface resources.

Figure 2:
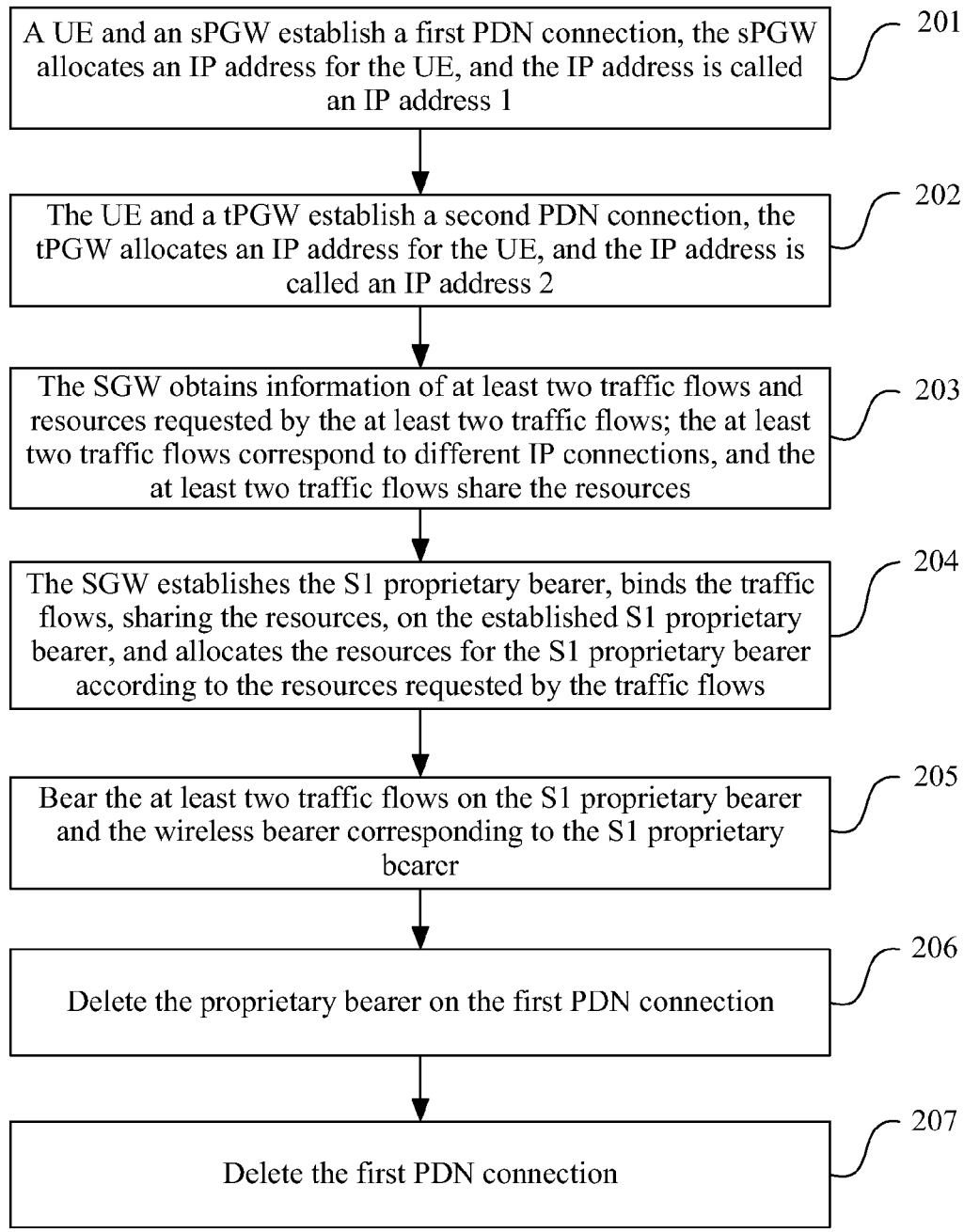
FIG. 2 is a flow chart of another embodiment of the method for traffic flows to share resources according to the present invention.

FIG. 2 is a flow chart of another embodiment of the method for traffic flows to share resources according to the present invention. The embodiment is used to describe the method for traffic flows to share resources in a 3GPP access situation, in which a data channel is a wireless bearer and an S1 proprietary bearer, the wireless bearer and the S1 proprietary bearer correspond to one default bearer, and the default bearer corresponds to multiple PDN connections. As shown in FIG. 2, the embodiment includes:

Step 201: A UE and a source PGW (source PGW; sPGW for short below) establish a first PDN connection, the sPGW allocates an IP address for the UE, and the IP address is called an IP address 1.

Specifically, after the UE and the sPGW establish the first PDN connection, the sPGW allocates the IP address 1 to the UE. The UE may initiate a service based on the obtained IP address 1, and establish a proprietary bearer related to the initiated service on the first PDN connection.

Step 202: The UE and a target PGW (target PGW; tPGW for short below) establish a second PDN connection, the tPGW allocates an IP address to the UE, and the IP address is called an IP address 2. The sPGW and the tPGW may be different PGWs or the same PGW.

In the embodiment of the present invention, an example of establishing two PDN connections is taken for illustration, but the embodiment of the present invention is not limited thereto, and three or more PDN connections may be established through the method provided by the embodiment of the present invention.

Figure 3:
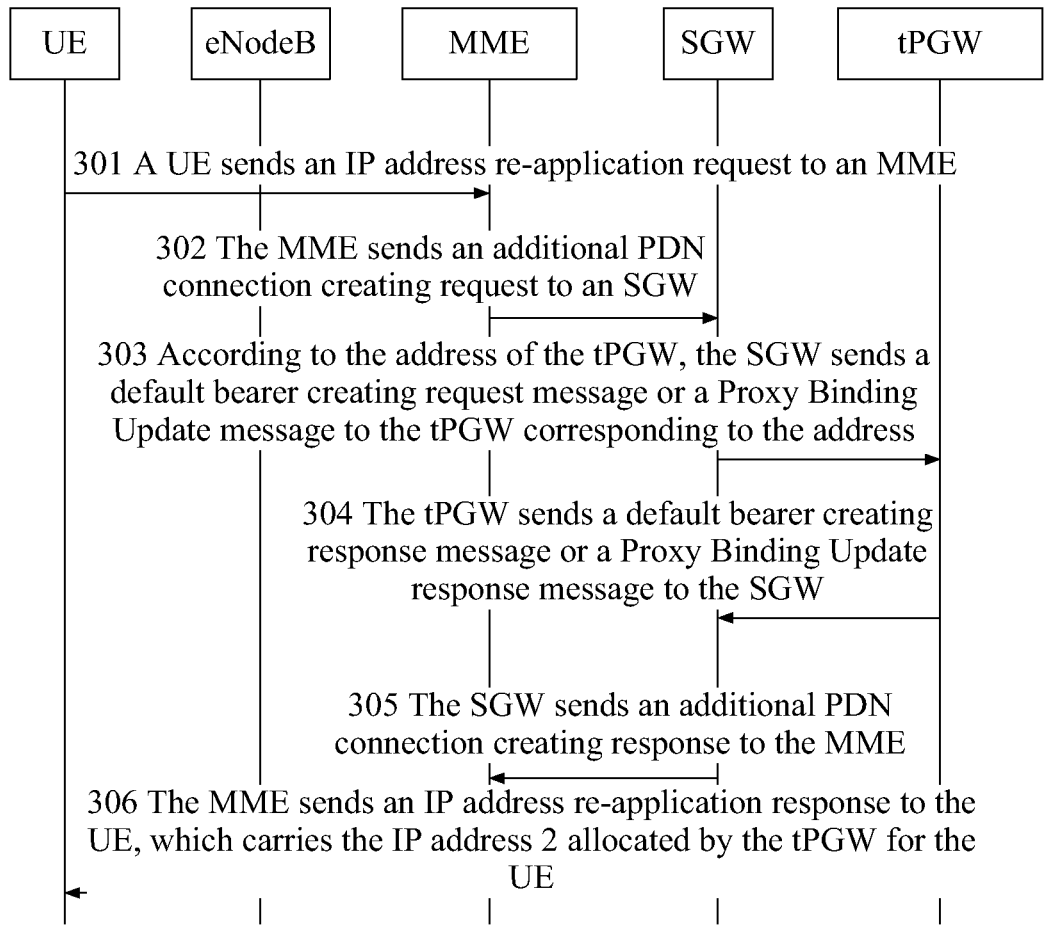
FIG. 3 is a signaling flow chart of an embodiment of establishing a second PDN connection between a UE and a tPGW according to the present invention.

FIG. 3 is a signaling flow chart of an embodiment of establishing a second PDN connection between a UE and a tPGW according to the present invention. As shown in FIG. 3, the process includes:

Step 301: A UE sends an IP address re-application request to a Mobility Management Entity (Mobility Management Entity; MME for short below). The IP address re-application request carries an identifier of a default bearer used for establishing a first PDN connection between the UE and an sPGW, for example a Linked Bearer Identity (Linked Bearer Identity; LBI for short below), and may further carry an Access Point Name (Access Point Name; APN for short below) used for establishing the first PDN connection. The IP address re-application request may be a new message. Alternatively, the IP address re-application request may also be an existing PDN connection request message, and in this case, the PDN connection request message is required to carry an added indicator, which is used to indicate that the PDN connection request message requests an IP address re-application operation based on an original PDN connection.

Step 302: The MME sends an additional PDN connection creating request to an SGW. The additional PDN connection creating request carries LBI information and APN information of the default bearer that are used for establishing the first PDN connection between the UE and the sPGW and a selected address of the tPGW. The address of the tPGW is selected by the MME, and the MME may select the address of the tPGW more suitable than that of the sPGW according to current location information of the UE.

Step 303: According to the address of the tPGW, the SGW sends a default bearer creating request message or a Proxy Binding Update message to the tPGW corresponding to the address.

Specifically, when the GTP is employed between the SGW and the tPGW, the SGW sends a default bearer creating request (Create Default Bearer Request) to the tPGW. A Bearer Identifier (Bearer Identifier; Bearer ID for short below) carried in the default bearer creating request is the same as the LBI carried in the additional PDN connection creating request, so that EPS bearer identifiers (EPS_Bearer_ID) of two S5/S8 default bearers established between the SGW and the sPGW and between the SGW and the tPGW are the same. Then, the tPGW and the PCRF entity perform PCC interaction. The PCRF entity is notified of the address of the tPGW, in which the address is used to receive a PCC policy delivered by a subsequent PCRF entity.

When a PMIP is employed between the SGW and the tPGW, the SGW sends a Proxy Binding Update (Proxy Binding Update; PBU for short below) message to the tPGW. Then, the SGW and the PCRF entity perform PCC interaction.

Step 304: The tPGW sends a default bearer creating response message or a Proxy Binding Update response message to the SGW. The response message carries the IP address 2 allocated by the tPGW for the UE.

Step 305: The SGW sends an additional PDN connection creating response to the MME. The additional PDN connection creating response carries the IP address 2 allocated by the tPGW for the UE, and may further carry new Protocol Configuration Option (Protocol Configuration Option; PCO for short below) information, for example, an address of a Proxy Call Session Control Function (Proxy Call Session Control Function; P-CSCF for short below).

Further, the SGW may record the relationship between the IP address 1 and the IP address 2 sharing the wireless bearer and the IP address 1 and the IP address 2 sharing the S1 default bearer, where the S1 default bearer corresponds to the S1 proprietary bearer in a one-to-one manner.

Step 306: The MME sends an IP address re-application response to the UE, which carries the IP address 2 allocated by the tPGW for the UE.

Therefore, the UE establishes the second PDN connection, and the first PDN connection and the second PDN connection share the wireless bearer and the S1 default bearer.

In the embodiment, the process of establishing the second PDN connection is initiated by the UE. If the MME initiates the process of establishing the second PDN connection, step 302 may be directly executed, and in step 306 the MME actively sends an IP address update request to the UE.

Step 203: The SGW obtains information of at least two traffic flows and resources requested by the at least two traffic flows. The at least two traffic flows correspond to different IP connections, and the at least two traffic flows share the resources.

The information of the traffic flow is specifically the TFT. The resources requested by the traffic flow include the QCI or bandwidth.

The information of the at least two traffic flows and the resources requested by the at least two traffic flows are carried by a resource request of the PCRF entity.

Specifically, when the GTP is employed between the SGW and the tPGW, the resource request of the PCRF entity is sent to the sPGW or the tPGW. The SGW receives the resource request of the PCRF entity from the sPGW or the tPGW. The resource request of the PCRF entity indicates the relationship of the traffic flows sharing the resources, in which the traffic flows correspond to the local IP address 1 and IP address 2 of the UE. The traffic flows corresponding to the local IP address 1 and IP address 2 of the UE may share the default bearer, and may also share the proprietary bearer.

In order to employ, between the PCRF entity and the PGW, a Gx interface of the Diameter protocol, and employ, between the SGW and the PGW, an S5/S8 interface of the GTP to transfer the relationship of traffic flows sharing resources, in which the traffic flows correspond to multiple IP addresses, the Gx interface protocol and the S5/S8 interface protocol in the prior art may be extended by adding a parameter, for example, an Associate Traffic Flow Template (Associate Traffic Flow Template; AssociateTFT for short below) parameter. The value of the parameter is the same as that of the TFT parameter in the prior art, and the parameter is used to indicate that the current traffic flows corresponding to the TFT and the AssociateTFT share the resources.

When the PMIP is employed between the SGW and the tPGW, the SGW directly receives the resource request of the PCRF entity from the PCRF entity. The resource request of the PCRF entity indicates a relationship of the traffic flows sharing the resources, in which the traffic flows correspond to the local IP address 1 and IP address 2 of the UE.

The PCRF entity may obtain, from the resource request initiated by the UE, the relationship of the traffic flows sharing the resources, in which the traffic flows correspond to the local IP address 1 and IP address 2 of the UE.

In order to employ, between the PCRF entity and the SGW, a Gxc interface of the Diameter protocol to transfer the relationship of traffic flows sharing resources, in which the traffic flows correspond to multiple IP addresses, the Gxc interface protocol in the prior art may be extended by adding a parameter, for example, an AssociateTFT parameter. The value of the parameter is the same as that of the TFT parameter in the prior art, and the parameter is used to indicate that the current traffic flows corresponding to the TFT and the AssociateTFT share the resources.

Alternatively, the resource request of the PCRF entity may only include information of one traffic flow of the User Equipment. In this case, the resource request of the PCRF entity does not include the AssociateTFT parameter, the SGW may generate the information of the at least two traffic flows corresponding to different IP addresses and the relationship of the at least two traffic flows sharing the resources according to the information of the traffic flow and the relationship, which is of the IP address 1 and the IP address 2 sharing the wireless bearer and the S1 default bearer and is recorded in step 305.

Therefore, the SGW obtains the information of the at least two traffic flows sharing the resources. The resources shared by the at least two traffic flows may include the bandwidth or QCI.

Step 204: The SGW establishes the S1 proprietary bearer, binds the traffic flows, sharing the resources, on the established S1 proprietary bearer, and allocates the resources for the S1 proprietary bearer according to the resources requested by the traffic flows.

Specifically, if the SGW already establishes the S1 proprietary bearer corresponding to one traffic flow among the multiple traffic flows of step 203, the SGW binds all TFTs corresponding to the multiple traffic flows on the S1 proprietary bearer. The S1 proprietary bearer and the wireless bearer form a one-to-one mapping relationship.

If the SGW does not establish the S1 proprietary bearer corresponding to any one traffic flow among the multiple traffic flows of step 203, the SGW establishes the S1 proprietary bearer, and binds the TFTs corresponding to the multiple traffic flows on the S1 proprietary bearer. The S1 proprietary bearer and the wireless bearer form a one-to-one mapping.

The multiple traffic flows correspond to different IP connections. That is, each traffic flow among the multiple traffic flows uses different IP addresses of the same version. For example, it is assumed that the UE establishes two IP connections, a first IP connection allocates an IPv4 address IP1 and an IPv6 address IPa to the UE, and a second IP connection allocates an IPv4 address IP2 and an IPv6 address IPb to the UE, so that the following traffic flows correspond to different IP connections respectively:

1) traffic flows with the IP addresses being IP1 and IP2;
2) traffic flows with the IP addresses being IP1 and IPb;
3) traffic flows with the IP addresses being IPa and IP2; and
4) traffic flows with the IP addresses being IPa and IPb.

Then, the SGW may deliver a binding relationship of the TFTs corresponding to the multiple traffic flows and the S1 proprietary bearer to the UE. The UE may perform uplink data flow classification according to the binding relationship. The SGW may send the resources bound on the S1 proprietary bearer to the access network, so that the access network performs resource reservation.

Therefore, the SGW establishes the corresponding S1 proprietary bearer for the multiple traffic flows obtained in step 203, and allocates corresponding resources for the established S1 proprietary bearer.

Step 205: Bear the at least two traffic flows on the S1 proprietary bearer and the wireless bearer corresponding to the S1 proprietary bearer.

In the embodiment of the present invention, the S1 proprietary bearer is the data channel, and the data channel can bear multiple traffic flows of different IP addresses of the UE.

Specifically, for a downlink data packet received by the SGW from the S5/S8 interface, no matter the data packet is from the tPGW and has a destination IP address being the IP address 2 or the data packet is from the sPGW and has a destination IP address being the IP address 1, and no matter the S5/S8 interface employs the GTP or the PMIP, the SGW may always map the traffic flows to the S1 proprietary bearer established in step 204 according to a mapping relationship between the traffic flow and the data channel, and send the received downlink data packet through the S1 proprietary bearer. Each S1 proprietary bearer only transfers a traffic flow corresponding to a specific TFT, so that a traffic flow that cannot be mapped to the S1 proprietary bearer may be transferred on an S1 default bearer.

For an uplink data packet sent by the UE, the UE may send an uplink data packet of a corresponding traffic flow through the wireless bearer corresponding to the S1 proprietary bearer according to the binding relationship that is received in step 204 and is between the TFTs corresponding to the multiple traffic flows and the S1 proprietary bearer. After receiving the uplink data packet, the SGW forwards the received uplink data packet to different PGWs according to a source IP address carried in the uplink data packet. For example, the uplink data packet with the source IP address being the IP address 1 is forwarded to the sPGW, and the uplink data packet with the source IP address being the IP address 2 is forwarded to the tPGW.

Step 206: Delete the proprietary bearer on the first PDN connection.

Specifically, when the GTP is employed between the SGW and the sPGW, the PCRF entity sends a session resource request to the sPGW first. The session resource request carries a PCC rule. The PCC rule includes a TFT required to be deleted by the sPGW. The sPGW sends a proprietary bearer deletion request to the SGW, in which the proprietary bearer deletion request is used to delete a corresponding S5/S8 proprietary bearer on the sPGW. The proprietary bearer deletion request includes the TFT, which is on the sPGW and is required to be deleted.

When the PMIP is employed between the SGW and the sPGW, the PCRF entity sends a session resource request to the SGW first. The session resource request carries a PCC rule, and the PCC rule includes the TFT required to be deleted by the sPGW.

Then, the SGW executes bearer binding, maps the TFT required by the proprietary bearer deletion request to be deleted to a proprietary bearer which is already established, and sends a bearer update request to the MME, which carries the updated TFT after the TFT on the sPGW is deleted. The MME executes a bearer update operation according to bearer update request, and deletes the S1 proprietary bearer corresponding to the TFT required to be deleted.

Step 207: Delete the first PDN connection.

Figure 4:
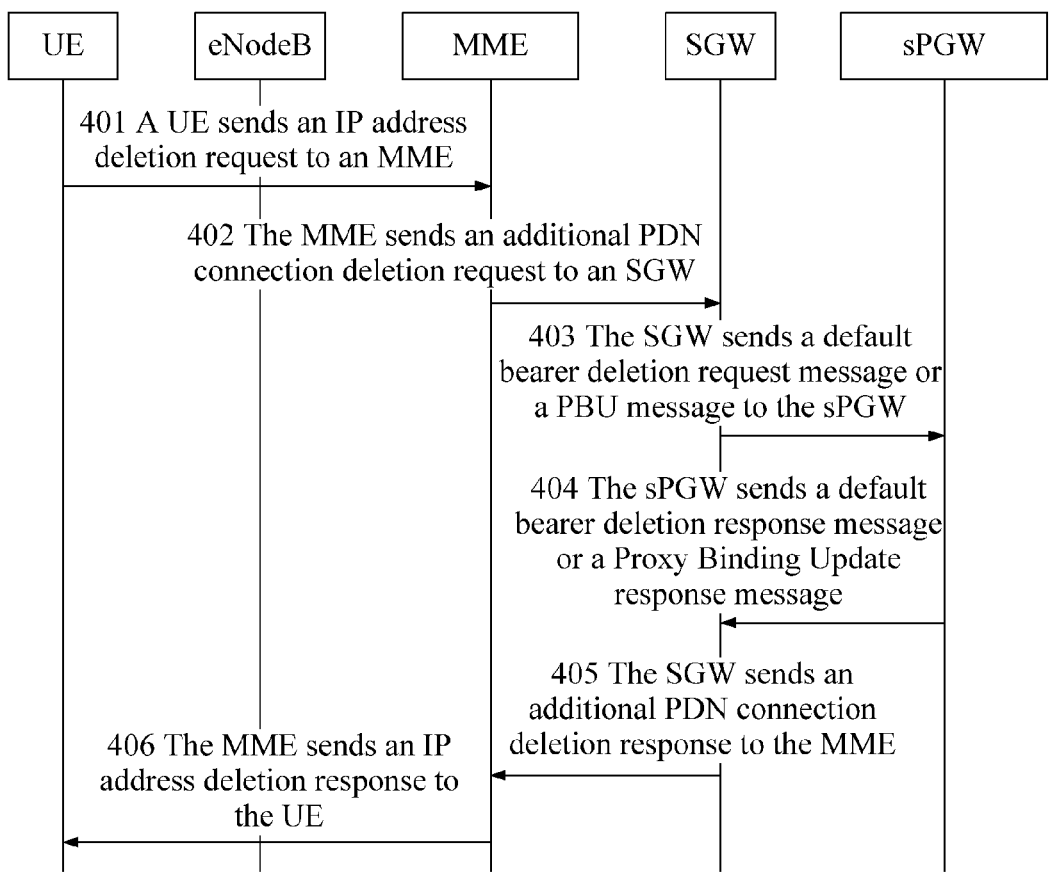
FIG. 4 is a signaling flow chart of an embodiment of deleting a first PDN connection according to the present invention.

FIG. 4 is a signaling flow chart of an embodiment of deleting the first PDN connection according to the present invention. As shown in FIG. 4, the process includes:

Step 401: A UE sends an IP address deletion request to an MME. The IP address deletion request carries LBI and APN information of an original default bearer between the UE and an sPGW, and an IP address required to be deleted.

Step 402: The MME sends an additional PDN connection deletion request to an SGW. The additional PDN connection deletion request carries the LBI and APN information of the original default bearer between the UE and the sPGW, and the IP address required to be deleted.

Step 403: The SGW sends a default bearer deletion request message or a PBU message to the sPGW.

Specifically, when the GTP is employed between the SGW and the sPGW, the SGW sends a default bearer deletion request (Delete Bearer Request) message to the sPGW; when the PMIP is employed between the SGW and the sPGW, the SGW sends the PBU message to the sPGW.

Step 404: The sPGW sends a default bearer deletion response message or a Proxy Binding Update response message.

Step 405: The SGW sends an additional PDN connection deletion response to the MME.

Step 406: The MME sends an IP address deletion response to the UE.

In the embodiment, the process of deleting the first PDN connection is initiated by the UE. If the MME initiates the process of deleting the first PDN connection, step 402 may be directly executed, and in step 406 the deleted IP address or a remaining IP address after the deletion is sent to the UE.

Further, the process of deleting the first PDN connection may also be initiated by the SGW, the sPGW, or the PCRF entity. If the SGW initiates the process of deleting the first PDN connection, step 403 may directly be executed, and in step 406 the deleted IP address or a remaining IP address after the deletion is sent to the UE.

If the sPGW initiates the process of deleting the first PDN connection, the sPGW may directly send the default bearer deletion request message to the SGW, then the SGW sends the IP address update request to the MME, and the MME sends the IP address update request to the UE. The IP address update request carries the deleted IP address or a remaining IP address after the deletion.

If the PCRF entity initiates the process of deleting the first PDN connection, the PCRF entity may directly send a PDN connection deletion request to the sPGW, and the sPGW sends the default bearer deletion request message to the SGW.

The method of deleting the first PDN connection may be applied in a PGW reallocation scenario. In the PGW reallocation scenario, the IP address of the UE may change. In the embodiment of the present invention, during the change of the IP address, traffic flows corresponding to different IP addresses may be borne by the wireless bearer and the S1 proprietary bearer, thereby ensuring service continuity and QoS. After the PGW reallocation is completed, the traffic flow uses the IP address 2, and the first PDN connection is required to be deleted.

In the embodiment of the present invention, the two PDN connections share the wireless bearer and the S1 default bearer, and the S1 default bearer and the S1 proprietary bearer form a one-to-one mapping, so it is achieved that multiple traffic flows of different IP addresses of the User Equipment are borne on the S1 proprietary bearer.

Figure 5:
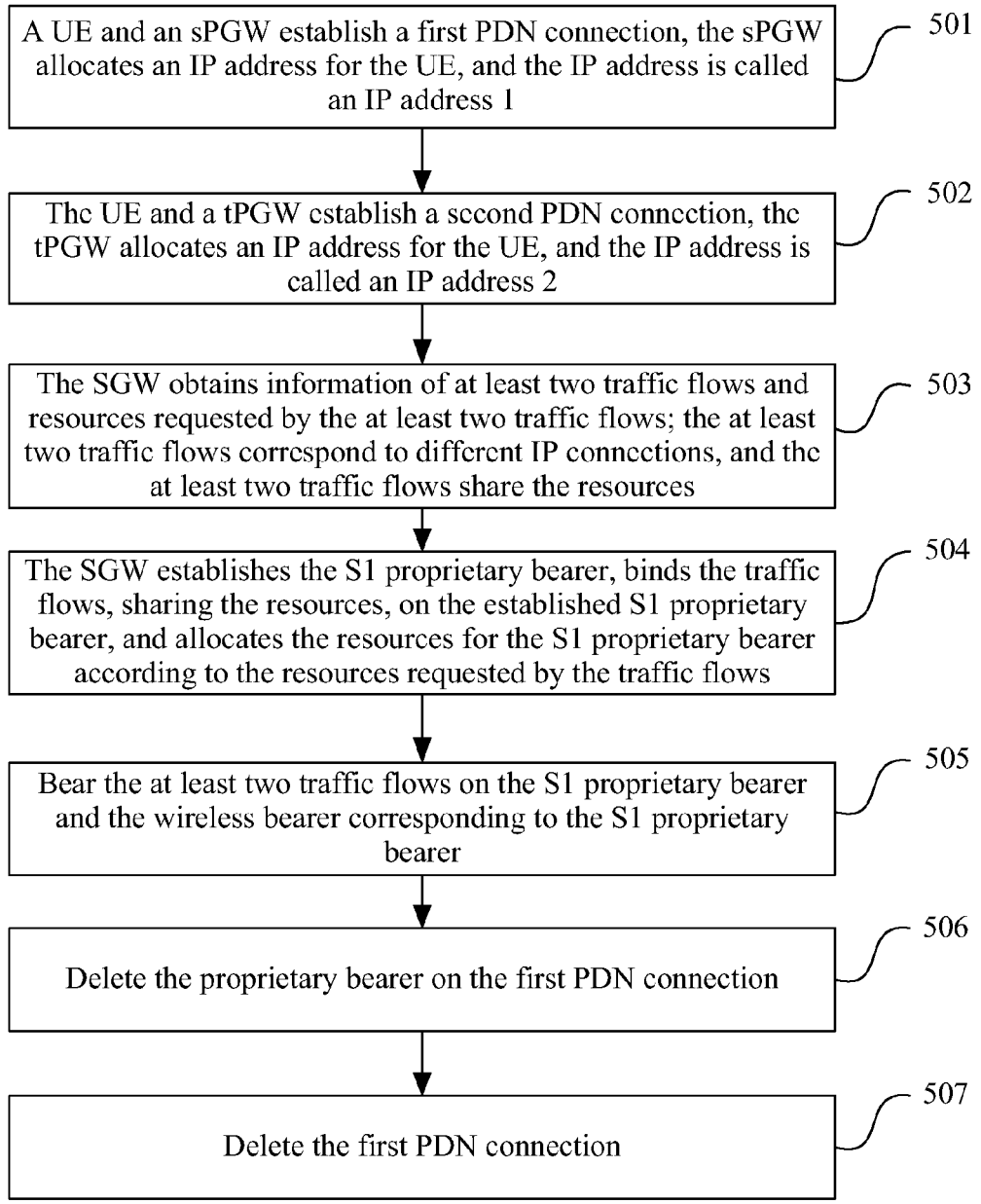
FIG. 5 is a flow chart of another embodiment of the method for traffic flows to share resources according to the present invention.

FIG. 5 is a flow chart of another embodiment of the method for traffic flows to share resources according to the present invention. The embodiment is used to describe the method for traffic flows to share resources in a 3GPP access situation, in which a data channel is a wireless bearer and an S1 proprietary bearer, the wireless bearer and the S1 proprietary bearer correspond to a default bearer, and the default bearer corresponds to multiple PDN connections. As shown in FIG. 5, the embodiment includes:

Step 501: A UE and an sPGW establish a first PDN connection, the sPGW allocates an IP address for the UE, and the IP address is called an IP address 1.

Specifically, after the UE and the sPGW establish the first PDN connection, the sPGW allocates the IP address 1 for the UE. The UE may initiate a service based on the obtained IP address 1, and establish a proprietary bearer related to the initiated service on the first PDN connection.

Step 502: The UE and a tPGW establish a second PDN connection, the tPGW allocates an IP address for the UE, and the IP address is called an IP address 2. The sPGW and the tPGW may be different PGWs or the same PGW.

In this step, a network side equipment is required to select a new tPGW for the PDN connection, so that the UE is required to carry, in a PDN connection request, a PGW re-selection instruction, for example a routing optimization instruction, which is used to indicate that the network is required to select a new PGW. When an MME receives the PDN connection request, a new PGW, that is the tPGW in this step, is selected for the PDN connection. Then, the MME sends the address of the tPGW to an SGW.

Step 503: The SGW obtains information of at least two traffic flows and resources requested by the at least two traffic flows. The at least two traffic flows correspond to different IP connections, and the at least two traffic flows share the resources.

The information of the traffic flow is specifically the TFT. The resources requested by the traffic flow include the QCI or bandwidth.

The information of the at least two traffic flows and the resources requested by the at least two traffic flows are carried by a resource request of the PCRF entity.

Specifically, when the GTP is employed between the SGW and the tPGW, the resource request of the PCRF entity is sent to the sPGW or the tPGW. The SGW receives the resource request of the PCRF entity from the sPGW or the tPGW. The resource request of the PCRF entity indicates the relationship of the traffic flows sharing the resources, in which the traffic flows correspond to the local IP address 1 and IP address 2 of the UE. The traffic flows corresponding to the local IP address 1 and IP address 2 of the UE may share the default bearer, and may also share the proprietary bearer.

In order to employ, between the PCRF entity and the PGW, a Gx interface of the Diameter protocol, and employ, between the SGW and the PGW, an S5/S8 interface of the GTP to transfer the relationship of traffic flows sharing resources, in which the traffic flows correspond to multiple IP addresses, the Gx interface protocol and the S5/S8 interface protocol in the prior art may be extended by adding a parameter, for example, an AssociateTFT parameter. The value of the parameter is the same as that of the TFT parameter in the prior art, and the parameter is used to indicate that the current traffic flows corresponding to the TFT and the AssociateTFT share the resources.

When the PMIP is employed between the SGW and the tPGW, the SGW directly receives the resource request of the PCRF entity from the PCRF entity. The resource request of the PCRF entity indicates a relationship of the traffic flows sharing the resources, in which the traffic flows correspond to the local IP address 1 and IP address 2 of the UE. The PCRF entity may obtain the relationship of the traffic flows sharing the resources according to the resource request initiated by the UE, in which the traffic flows correspond to the local IP address 1 and IP address 2 of the UE.

In order to employ, between the PCRF entity and the SGW, a Gxc interface of the Diameter protocol to transfer the relationship of traffic flows sharing resources between the PCRF entity and the SGW, corresponding to multiple IP addresses, the Gxc interface protocol in the prior art may be extended by adding a parameter, for example, an AssociateTFT parameter. The value of the parameter is the same as that of the TFT parameter in the prior art, and the parameter is used to indicate that the current traffic flows corresponding to the TFT and the AssociateTFT share the resources.

Alternatively, the resource request of the PCRF entity may only include information of one traffic flow of the User Equipment. In this case, the resource request of the PCRF entity does not include the AssociateTFT parameter, the SGW may generate the information of the at least two traffic flows corresponding to different IP addresses and the relationship of the at least two traffic flows sharing the resources according to the information of the traffic flow and the recorded relationship between the IP address 1 and the IP address 2 sharing and the IP address 1 and the IP address 2 sharing the wireless bearer and the S1 default bearer.

Therefore, the SGW obtains the information of the at least two traffic flows sharing the resources. The resources shared by the at least two traffic flows may include the bandwidth occupied by the traffic flows or the QCI.

Step 504: The SGW establishes the S1 proprietary bearer, binds the traffic flows, sharing the resources, on the established S1 proprietary bearer, and allocates the resources for the S1 proprietary bearer according to the resources requested by the traffic flows.

Specifically, if the SGW already establishes the S1 proprietary bearer corresponding to one traffic flow among the multiple traffic flows of step 503, the SGW binds all TFTs corresponding to the multiple traffic flows on the S1 proprietary bearer. The S1 proprietary bearer and the wireless bearer form a one-to-one mapping.

If the SGW does not establish the S1 proprietary bearer corresponding to any one traffic flow among the multiple traffic flows of step 503, the SGW establishes the S1 proprietary bearer, and binds the TFTs corresponding to the multiple traffic flows on the S1 proprietary bearer. The S1 proprietary bearer corresponds to multiple S1 default bearers. The multiple S1 default bearers may belong to the same UE, or may belong to an APN of a UE.

The multiple traffic flows correspond to different IP connections. That is, each traffic flow among the multiple traffic flows uses different IP addresses of the same version. For example, it is assumed that the UE establishes two IP connections, a first IP connection allocates an IPv4 address IP1 and an IPv6 address IPa for the UE, and a second IP connection allocates an IPv4 address IP2 and an IPv6 address IPb for the UE, so that the following traffic flows correspond to different IP connections respectively:

1) traffic flows with the IP addresses being IP1 and IP2;
2) traffic flows with the IP addresses being IP1 and IPb;
3) traffic flows with the IP addresses being IPa and IP2; and
4) traffic flows with the IP addresses being IPa and IPb.

Then, the SGW may deliver a binding relationship of the TFTs corresponding to the multiple traffic flows and the S1 proprietary bearer to the UE. The UE may perform uplink data flow classification according to the binding relationship. The SGW may send the resources bound on the S1 proprietary bearer to the access network, in which the resources are used for access network resource reservation.

Therefore, the SGW establishes the corresponding S1 proprietary bearer for the multiple traffic flows obtained in step 503, and allocates corresponding resources to the established S1 proprietary bearer.

Step 505: Bear the at least two traffic flows on the S1 proprietary bearer and the wireless bearer corresponding to the S1 proprietary bearer.

In the embodiment of the present invention, the S1 proprietary bearer is the data channel, and the data channel can bear multiple traffic flows of different IP addresses of the UE.

Specifically, for a downlink data packet received by the SGW from the S5/S8 interface, no matter the data packet is from the tPGW and has a destination IP address being the IP address 2 or the data packet is from the sPGW and has a destination IP address being the IP address 1, and no matter the S5/S8 interface employs the GTP or the PMIP, the SGW may always map the traffic flows to the S1 proprietary bearer established in step 504 according to a mapping relationship between the traffic flow and the data channel, and send the received downlink data packet through the S1 proprietary bearer. Each S1 proprietary bearer only transfers a traffic flow corresponding to a specific TFT, so that a traffic flow that cannot be mapped to the S1 proprietary bearer may be transferred on an S1 default bearer.

For an uplink data packet sent by the UE, the UE may send an uplink data packet of a corresponding traffic flow through the wireless bearer corresponding to the S1 proprietary bearer according to the binding relationship that is received in step 504 and is between the TFTs corresponding to the multiple traffic flows and the S1 proprietary bearer. After receiving the uplink data packet, the SGW forwards the received uplink data packet to different PGWs according to a source IP address carried in the uplink data packet. For example, the uplink data packet with the source IP address being the IP address 1 is forwarded to the sPGW, and the uplink data packet with the source IP address being the IP address 2 is forwarded to the tPGW.

Step 506: Delete the proprietary bearer on the first PDN connection.

Specifically, when the GTP is employed between the SGW and the sPGW, the PCRF entity sends a session resource request to the source PGW first. The session resource request carries a PCC rule. The PCC rule includes a TFT required to be deleted by the sPGW. The sPGW sends a proprietary bearer deletion request to the SGW, in which the proprietary bearer deletion request is used to delete a corresponding S5/S8 proprietary bearer on the sPGW. The proprietary bearer deletion request includes the TFT, which is on the sPGW and is required to be deleted.

When the PMIP is employed between the SGW and the sPGW, the PCRF entity sends a session resource request to the SGW first. The session resource request carries a PCC rule, and the PCC rule includes the TFT required to be deleted by the sPGW.

Then, the SGW executes bearer binding, maps the TFT required to be deleted in the proprietary bearer deletion request to a proprietary bearer which is already established, and sends a bearer update request to the MME, in which the bearer update request carries the updated TFT after the TFT on the sPGW is deleted. The MME executes a bearer update operation according to the bearer update request, and deletes the S1 proprietary bearer corresponding to the TFT required to be deleted.

Step 507: Delete the first PDN connection.

In the embodiment of the present invention, the process of deleting the first PDN connection may be initiated by the UE, the SGW, the sPGW, or the PCRF entity.

In the embodiment of the present invention, the two PDN connections share the wireless bearer and the S1 default bearer, but the S1 proprietary bearer corresponds to multiple S1 default bearers, and one default bearer corresponds to one PDN connection, so it is achieved that multiple traffic flows of different IP addresses of the User Equipment are borne on the S1 proprietary bearer.

Figure 6:
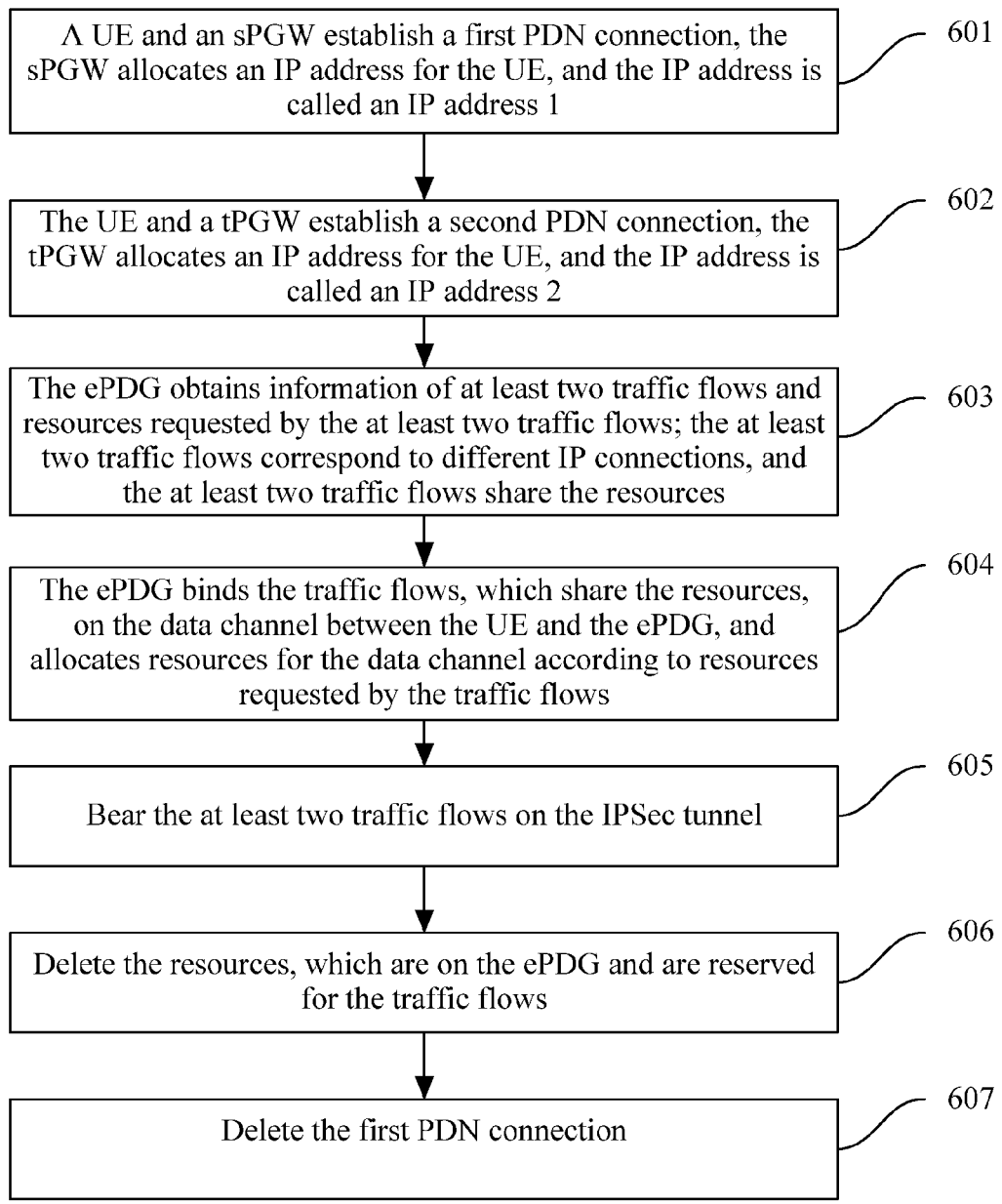
FIG. 6 is a flow chart of another embodiment of the method for traffic flows to share resources according to the present invention.

FIG. 6 is a flow chart of another embodiment of the method for traffic flows to share resources according to the present invention. In the embodiment, Wireless Fidelity (Wireless Fidelity; WiFi for short below) access is used as an example to describe the method for traffic flows to share resources in a non-3GPP access situation. As shown in FIG. 6, the embodiment includes:

Step 601: A UE and an sPGW establish a first PDN connection, the sPGW allocates an IP address to the UE, and the IP address is called an IP address 1.

A non-3GPP access manner includes two access manners, namely, a Trusted non-3GPP access manner and an Untrusted non-3GPP access manner. When the WiFi access acts as the Trusted non-3GPP access, the UE access a PGW through an access gateway in an access network. When the Wifi acts as the Untrusted non-3GPP, the UE access a PGW through an ePDG. Other non-3GPP access networks, for example, the Worldwide Interoperability for Microwave Access (Worldwide Interoperability for Microwave Access; Wimax for short below), an access manner of Worldwide Interoperability for Microwave Access is similar to the access manner of the WiFi.

In the embodiment of the present invention, the UE establishes a first PDN connection with an sPGW according to the process, which is specified in the 3GPP specification, that the UE establishes a PDN connection through a Trusted non-3GPP access network or an Untrusted non-3GPP access network. After the UE and the sPGW establish the first PDN connection, the sPGW allocates an IP address 1 for the UE, and the UE may initiate a service based on the obtained IP address 1.

Step 602: The UE and a tPGW establish a second PDN connection, the tPGW allocates an IP address for the UE, and the IP address is called an IP address 2.

Figure 7:
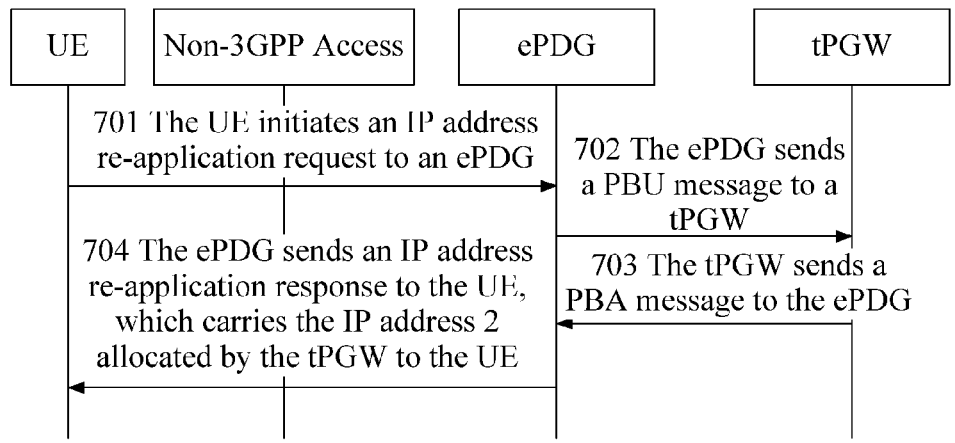
FIG. 7 is a signaling flow chart of another embodiment of establishing a second PDN connection between a UE and a tPGW according to the present invention.

FIG. 7 is a signaling flow chart of another embodiment of establishing a second PDN connection between a UE and a tPGW according to the present invention. FIG. 7 illustrates a scenario in which the UE performs accessing through the Untrusted non-3GPP. In the embodiment of the present invention, illustration is provided in the following by using the example of the Untrusted non-3GPP access. Unless there is a special specification, the processing manner of the Trusted non-3GPP access and that of the Untrusted non-3GPP are similar, and a difference lies in that: in the Untrusted non-3GPP access, the functions of the access gateway are implemented by an ePDG, and a data channel between the ePDG and the UE is an IPSec tunnel, but in the Trusted non-3GPP access, the functions of the access gateway are implemented by the access gateway in the access network, and a data channel between the access gateway in the access network and the UE is a tunnel based on other data link layer protocols related to the access technologies. As shown in FIG. 7, a process of establishing the second PDN connection includes:

Step 701: The UE initiates an IP address re-application request to an ePDG. When the UE performs accessing through the Untrusted non-3GPP, the IP address re-application request may be processed through the IPSec tunnel, which is already established in step 601, between the UE and the ePDG. When the UE performs accessing through the Trusted non-3GPP, the IP address re-application request may be processed through an access technology related data link layer message. The IP address re-application request may be a new message. Alternatively, the IP address re-application request may also be an existing PDN connection request message, and in this case, the PDN connection request message is required to carry an added indicator, which is used to indicate that the PDN connection request message requests an IP address re-application operation based on an original PDN connection. The IP address re-application request may further carry APN information of the first PDN connection.

Step 702: The ePDG sends a PBU message to a tPGW.

In the embodiment of the present invention, the PMIP protocol is employed between the ePDG and the tPGW, and the SGW sends the PBU message to the tPGW. Then, the ePDG and a PCRF entity perform PCC interaction.

Step 703: The tPGW sends a Proxy Binding Acknowledgement (Proxy Binding Acknowledgement; PBA for short below) message to the ePDG. The PBA message carries an IP address 2 allocated by the tPGW for the UE. After obtaining the IP address 2, the ePDG record a relationship of an IP address 1 and the IP address 2 sharing the data channel between the UE and the ePDG.

Step 704: The ePDG sends an IP address re-application response to the UE, in which the IP address re-application response carries the IP address 2 allocated by the tPGW for the UE.

Therefore, the UE establishes the second PDN connection, and the first PDN connection and the second PDN connection share the IPSec tunnel between the UE and the ePDG.

In the embodiment, the process of establishing the second PDN connection is initiated by the UE. If the ePDG initiates the process of establishing the second PDN connection, step 702 may be directly executed, and in step 704 the ePDG actively sends an IP address update request to the UE.

Step 603: The ePDG obtains information of at least two traffic flows and resources requested by the at least two traffic flows. The at least two traffic flows correspond to different IP connections, and the at least two traffic flows share the resources.

The information of the traffic flow is specifically the TFT. The resources requested by the traffic flow include the QCI or bandwidth.

The information of the at least two traffic flows and the resources requested by the at least two traffic flows are carried by a resource request of the PCRF entity.

Specifically, the ePDG may receive a resource request from the PCRF entity. The resource request indicates the relationship of the traffic flows sharing the resources, in which the traffic flows correspond to the local IP address 1 and IP address 2 of the UE. The PCRF entity may obtain, according to the resource request initiated by the UE, the relationship of the traffic flows sharing the resources, in which the traffic flows correspond to the local IP address 1 and IP address 2 of the UE.

In order to employ, between the PCRF entity and the ePDG, a Gxx interface of the Diameter protocol to transfer the relationship of traffic flows sharing resources, in which the traffic flows correspond to multiple IP addresses, the Gxx interface protocol in the prior art may be extended by adding a parameter, for example, an AssociateTFT parameter. The value of the parameter is the same as that of the TFT parameter in the prior art, and the parameter is used to indicate that the current traffic flows corresponding to the TFT and the AssociateTFT share the resources.

Alternatively, the resource request of the PCRF entity may only include information of one traffic flow of the User Equipment. In this case, the resource request of the PCRF entity does not include the AssociateTFT parameter, the ePDG may generate the information of the at least two traffic flows corresponding to different IP addresses and the relationship of the at least two traffic flows sharing the resources according to the information of the traffic flow and the relationship, which is of the IP address 1 and the IP address 2 sharing the data channel between the UE and the ePDG and is recorded in step 703.

Therefore, the SGW obtains the information of the at least two traffic flows sharing the resources. The resources shared by the at least two traffic flows may include the bandwidth or QCI.

Step 604: The ePDG binds the traffic flows, which share the resources, on the data channel between the UE and the ePDG, and allocates resources for the data channel according to resources requested by the traffic flows.

Specifically, the ePDG binds TFTs corresponding to the traffic flows, which share the resources, on the IPSec tunnel between the UE and the ePDG.

Then, the ePDG may deliver a binding relationship of the TFTs corresponding to the multiple traffic flows and the IPSec tunnel between the UE and the ePDG to the UE. The UE may perform uplink data flow classification according to the binding relationship. The SGW may send the resources bound on the IPSec tunnel between the UE and the ePDG to the access network, in which the resources are used for access network resource reservation.

Therefore, the ePDG binds the multiple traffic flows obtained in step 603 on the IPSec tunnel between the UE and the ePDG, and allocates corresponding resources for the IPSec tunnel.

Step 605: Bear the at least two traffic flows on the IPSec tunnel.

Specifically, for a downlink data packet received by the ePDG from an S2x interface, no matter the data packet is from the tPGW and has a destination IP address being the IP address 2 or the data packet is from the sPGW and has a destination IP address being the IP address 1, and no matter the S2x interface employs the GTP or the PMIP, the SGW may map the traffic flows to the IPSec tunnel between the UE and the ePDG, and sends the received downlink data packet through the IPSec tunnel.

For an uplink data packet sent by the UE, the UE may send an uplink data packet of a corresponding traffic flow through the IPSec tunnel between the UE and the ePDG according to the binding relationship that is received in step 604 and is between the TFTs corresponding to the multiple traffic flows and the IPSec tunnel. After receiving the uplink data packet, the ePDG forwards the received uplink data packet to different PGWs according to a source IP address carried in the uplink data packet. For example, the uplink data packet with the source IP address being the IP address 1 is forwarded to the sPGW, and the uplink data packet with the source IP address being the IP address 2 is forwarded to the tPGW.

In the embodiment of the present invention, the multiple traffic flows correspond to different IP connections. That is, the traffic flows among the multiple traffic flows use different IP addresses of the same version. For example, it is assumed that the UE establishes two IP connections, a first IP connection allocates an IPv4 address IP1 and an IPv6 address IPa for the UE, and a second IP connection allocates an IPv4 address IP2 and an IPv6 address IPb for the UE, so that the following traffic flows correspond to different IP connections respectively:

1) traffic flows with the IP addresses being IP1 and IP2;
2) traffic flows with the IP addresses being IP1 and IPb;
3) traffic flows with the IP addresses being IPa and IP2; and
4) traffic flows with the IP addresses being IPa and IPb.

Step 606: Delete the resources which are on the ePDG and are reserved for the traffic flows.

Figure 8:
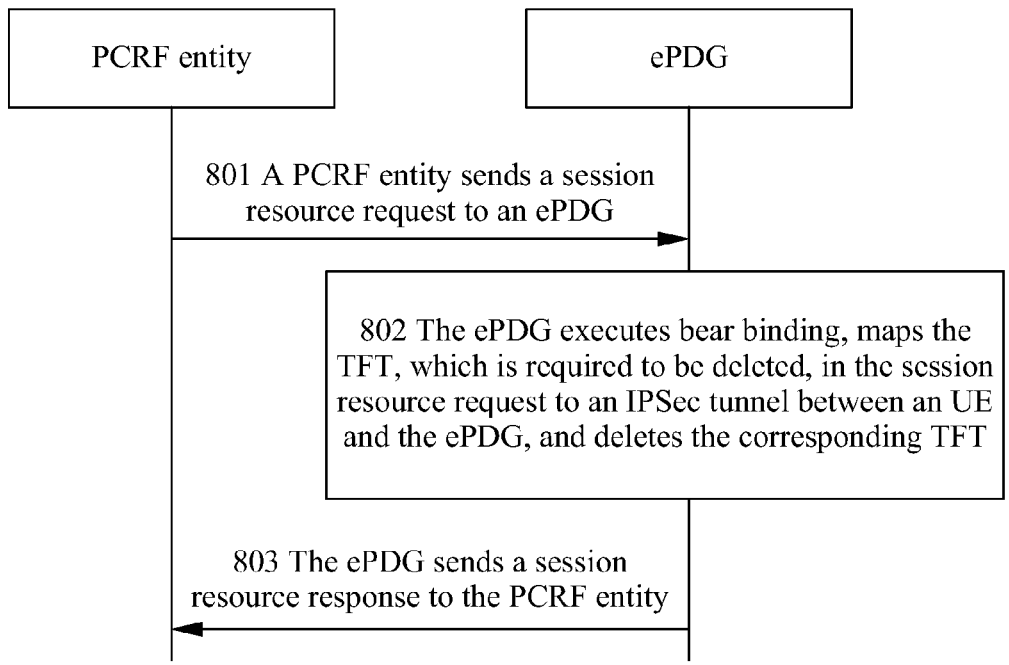
FIG. 8 is a signaling flow chart of an embodiment of deleting resources that are on an sPGW and reserved for traffic flows.

FIG. 8 is a signaling flow chart of an embodiment of deleting resources that are on an sPGW and reserved for traffic flows. As shown in FIG. 8, the process may include:

Step 801: A PCRF entity sends a session resource request to an ePDG. The session resource request carries a PCC rule, and the PCC rule includes a TFT required to be deleted by the ePDG.

Step 802: The ePDG executes bear binding, maps the TFT, which is required to be deleted, in the session resource request to an IPSec tunnel between an UE and the ePDG, and deletes the corresponding TFT.

Then, the ePDG may deliver an updated TFT to the UE.

Step 803: The ePDG sends a session resource response to the PCRF entity.

Therefore, the resources reserved by the ePDG for the traffic flows on the first PDN connection may be deleted.

Step 607: Delete the first PDN connection.

Figure 9:
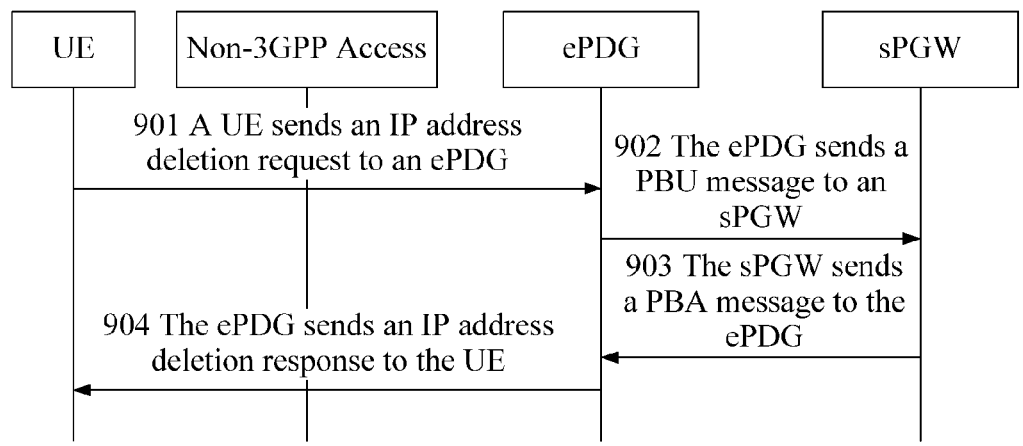
FIG. 9 is a signaling flow chart of another embodiment of deleting a first PDN connection according to the present invention.

FIG. 9 is a signaling flow chart of another embodiment of deleting the first PDN connection according to the present invention. As shown in FIG. 9, the process includes:

Step 901: A UE sends an IP address deletion request to an ePDG. The IP address deletion request carries an IP address required to be deleted and optional APN information.

Step 902: The ePDG sends a PBU message to an sPGW.

Step 903: The sPGW sends a PBA message to the ePDG.

Step 904: The ePDG sends an IP address deletion response to the UE.

In the embodiment, the process of deleting the first PDN connection is initiated by the UE. If the ePDG initiates the process of deleting the first PDN connection, step 902 may be directly executed, and in step 904 the deleted IP address or a remaining IP address after the deletion is sent to the UE.

Further, the process of deleting the first PDN connection may also be initiated by the sPGW or the PCRF entity.

The method of deleting the first PDN connection may be applied in a PGW reallocation scenario. In the PGW reallocation scenario, the IP address of the UE may change. In the embodiment of the present invention, during the change of the IP address, traffic flows corresponding to different IP addresses are borne by the IPSec tunnel, thereby ensuring service continuity and QoS. After the PGW reallocation is completed, the traffic flow uses the IP address 2, and the first PDN connection is required to be deleted.

In the embodiment of the present invention, two PDN connections on the sPGW and the tPGW share the IPSec tunnel between the UE and the ePDG, so that multiple traffic flows of different IP addresses of the User Equipment are borne on the IPSec tunnel.

Figure 10A:
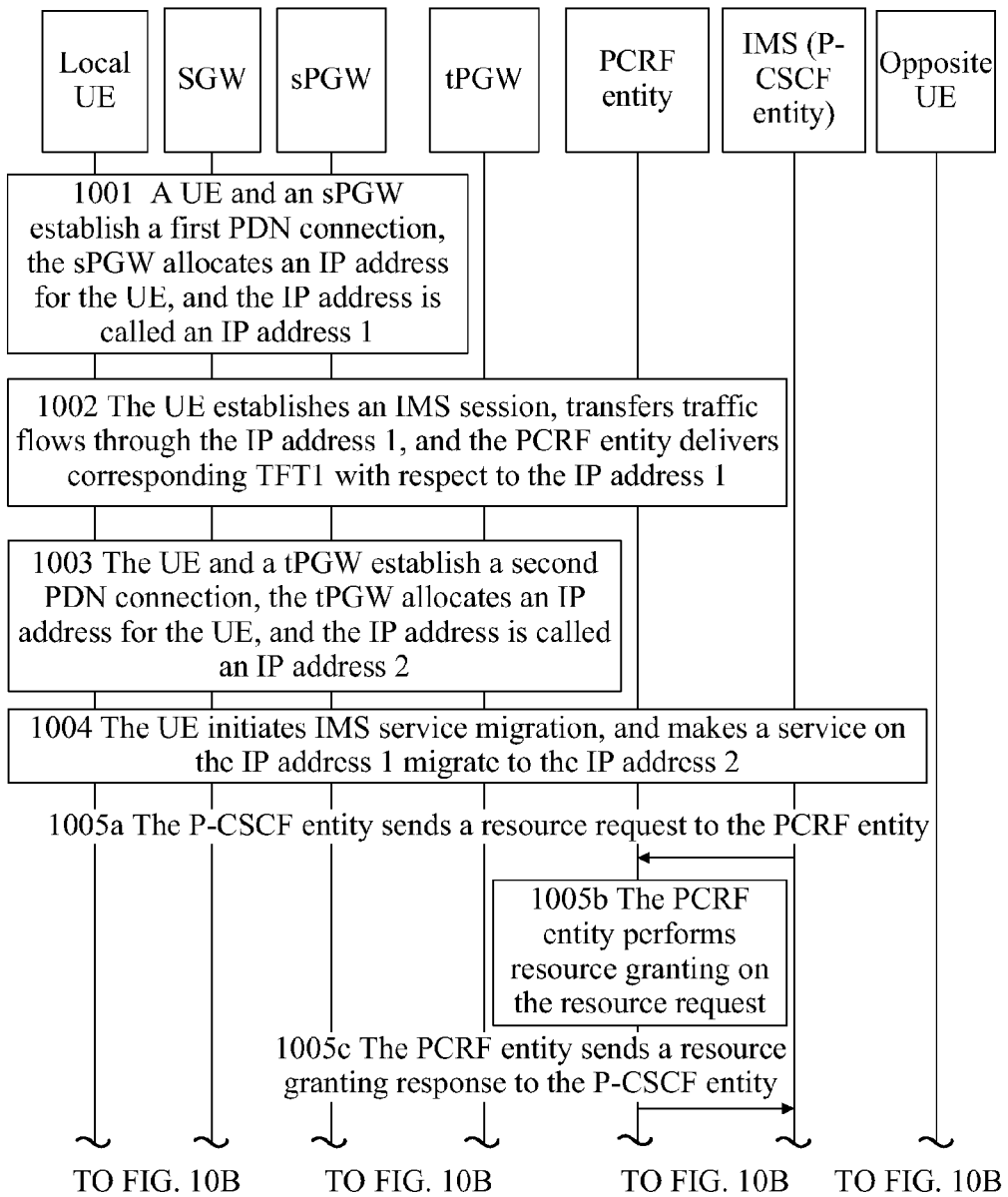
FIG. 10A and FIG. 10B are a flow chart of another embodiment of the method for traffic flows to share resources according to the present invention.
Figure 10B:
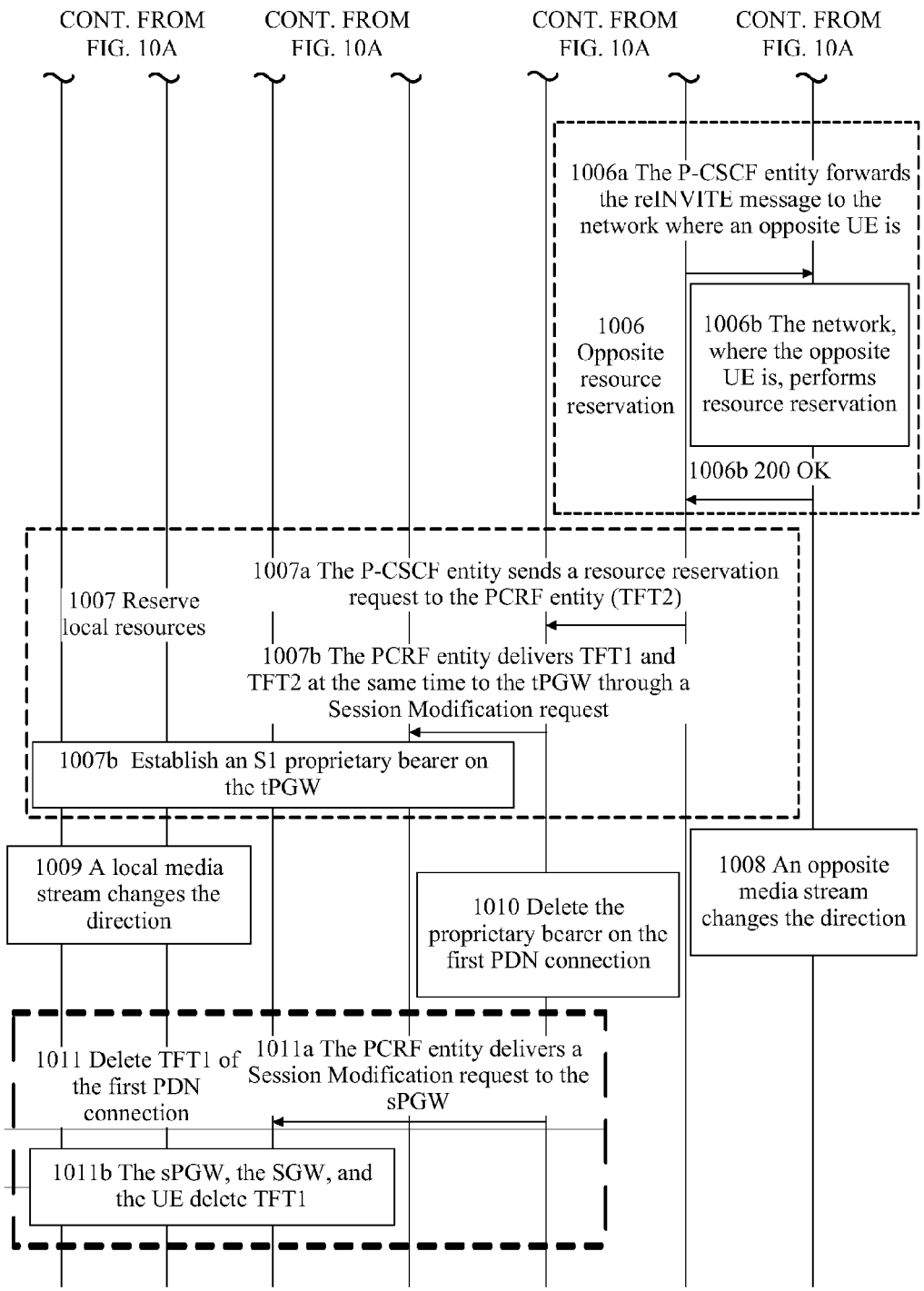

FIG. 10A and FIG. 10B are a flow chart of another embodiment of the method for traffic flows to share resources according to the present invention. In the embodiment, service migration is realized by traffic flows sharing resources. An example of an IP Multimedia Subsystem (IP Multimedia Subsystem; IMS for short below) is taken below to describe the method for traffic flows to share resources in a service migration process. In the embodiment of the present invention, a PCRF entity binds a relationship of an IP address 1 and an IP address 2 sharing resources. As shown in FIG. 10A and FIG. 10B, the embodiment includes:

Step 1001: A UE and an sPGW establish a first PDN connection, the sPGW allocates an IP address for the UE, and the IP address is called an IP address 1.

Step 1002: The UE establishes an IMS session, transfers traffic flows through the IP address 1, and the PCRF entity delivers corresponding TFT1 with respect to the IP address 1.

Step 1003: The UE and a tPGW establish a second PDN connection, the tPGW allocates an IP address for the UE, and the IP address is called an IP address 2.

In the step, an access gateway, namely an SGW, notifies the PCRF entity of a binding relationship between the IP address 1 and the IP address 2, and the PCRF entity records the binding relationship between the IP address 1 and the IP address 2.

Specifically, when the GTP is employed between the SGW and the tPGW, the SGW sends the binding relationship between the IP address 1 and the IP address 2 to the tPGW, and the tPGW notifies the PCRF entity. In order to employ, between the PCRF entity and the tPGW, a Gx interface of the Diameter protocol, and employ, between the SGW and the tPGW, an S5/S8 interface of the GTP to transfer the binding relationship of multiple IP addresses, the Gx interface protocol and the S5/S8 interface protocol in the prior art may be extended by adding a parameter, for example, an Associate IP Address (Associate IP Address; AssociateIPAddr for short below) parameter. The value of the parameter is the same as that of the IP Address parameter in the prior art, and the parameter is used to indicate the binding relationship between the IP address of the second PDN connection and the IP address of the first PDN connection.

When the PMIP is employed between the SGW and the tPGW, the SGW directly sends the binding relationship of the IP address 1 and the IP address 2 to the PCRF entity. In order to employ, between the PCRF entity and the SGW, a Gxx interface of the Diameter protocol to transfer the binding relationship of multiple IP addresses, the Gxx interface protocol in the prior art may be extended by adding a parameter, for example, an AssociateIPAddr parameter. The value of the parameter is the same as that of the IP Address parameter in the prior art, and the parameter is used to indicate the binding relationship between the IP address of the first PDN connection and the IP address of the second PDN connection.

Step 1004: The UE initiates IMS service migration, and makes a service on the IP address 1 migrate to the IP address 2.

Specifically, the UE sends a reINVITE message to a P-CSCF entity in an IMS network. The reINVITE message carries the IP address 2, and is used to change an IP address of a local traffic flow to the IP address 2.

Step 1005a: The P-CSCF entity sends a resource request to the PCRF entity. The resource request carries TFT2 corresponding to the IP address 2.

Step 1005b: The PCRF entity performs resource granting on the resource request.

The PCRF entity records the binding relationship between the IP address 1 and the IP address 2 in step 1003, so that the PCRF entity can obtain information of and TFT1 sharing the resources, in which the TFT2 corresponds to the IP address 2 and the TFT1 corresponds to the IP address 1. The PCRF entity does not need to grant additional resources to TFT2.

Step 1005c: The PCRF entity sends a resource granting response to the P-CSCF entity.

Step 1006: Reserve opposite resources. Specifically the step includes:

Step 1006a: The P-CSCF entity forwards the reINVITE message to the network where an opposite UE is.

Step 1006b: The network, where the opposite UE is, performs resource reservation, and returns a response message, for example 200 OK.

Step 1007: Reserve local resources. Specifically the step includes:

Step 1007a: The P-CSCF entity sends a resource reservation request to the PCRF entity, which carries TFT2 corresponding to the IP address 2.

The PCRF entity records the binding relationship between the IP address 1 and the IP address 2 in step 1003, so that the PCRF entity can obtain information of TFT2 and TFT1 sharing the resources, in which the TFT 2 corresponds to the IP address 2 and the TFT1 corresponds to the IP address 1.

Step 1007b: The PCRF entity delivers TFT1 and TFT2 at the same time to the tPGW through a Session Modification request so as to establish an S1 proprietary bearer on the tPGW, and binds multiple traffic flows on the S1 proprietary bearer.

Then, the SGW obtains the resource request, and binds corresponding traffic flows for the S1 proprietary bearer. In the embodiment of the present invention, the method for the SGW to bind the traffic flows is the same as those described in the embodiments of the present invention shown by FIG. 2 to FIG. 5, and is not repeated here.

In this case, for the local UE, the local UE sends and receives uplink and downlink data packets through the sPGW.

Step 1008: An opposite media stream changes the direction, and for the local UE, the local UE receives the downlink data packet through the tPGW.

Step 1009: A local media stream changes the direction, and for the local UE, the local UE sends the uplink data packet through the tPGW.

During the execution of step 1007, step 1008, and step 1009 in the embodiment of the present invention, the S1 proprietary bearer of the data channel between the UE and the SGW can bear multiple traffic flows of different local IP addresses.

Step 1010: Delete the proprietary bearer on the first PDN connection.

Specifically, the PCRF entity may employ the method described in the embodiment of the present invention shown in FIG. 4 or FIG. 5 to delete the proprietary bearer of the first PDN connection, which is not repeated here.

Step 1011: Delete TFT1 of the first PDN connection. Specifically the step includes:

Step 1011a: After the traffic flows are transferred, the PCRF entity delivers a Session Modification request to the sPGW, to request TFT1 of the first PDN connection to be deleted.

Step 1011b: The sPGW, the SGW, and the UE delete TFT1.

In the embodiment of the present invention, the PCRF entity binds the relationship of the IP address 1 and the IP address 2 sharing the resources, so it is achieved that in an IMS service migration process, multiple traffic flows of different IP addresses of the User Equipment are borne on the S1 proprietary bearer. Therefore, a network side apparatus does not need to allocate a new wireless bearer and S1 proprietary bearer for a traffic flow on a new IP address, thereby saving air interface resources.

Figure 11A:
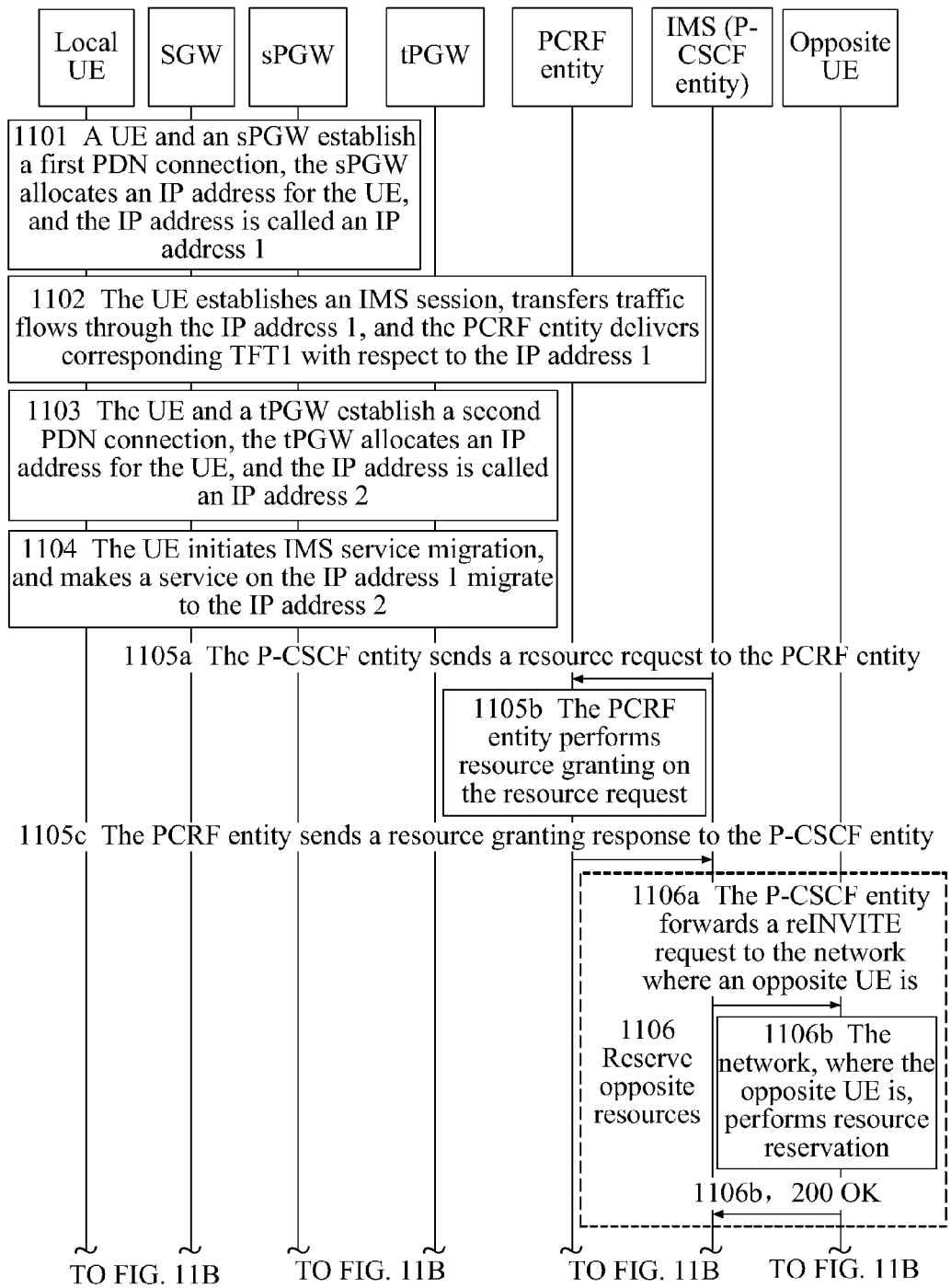
FIG. 11A and FIG. 11B are a flow chart of another embodiment of the method for traffic flows to share resources according to the present invention.
Figure 11B:
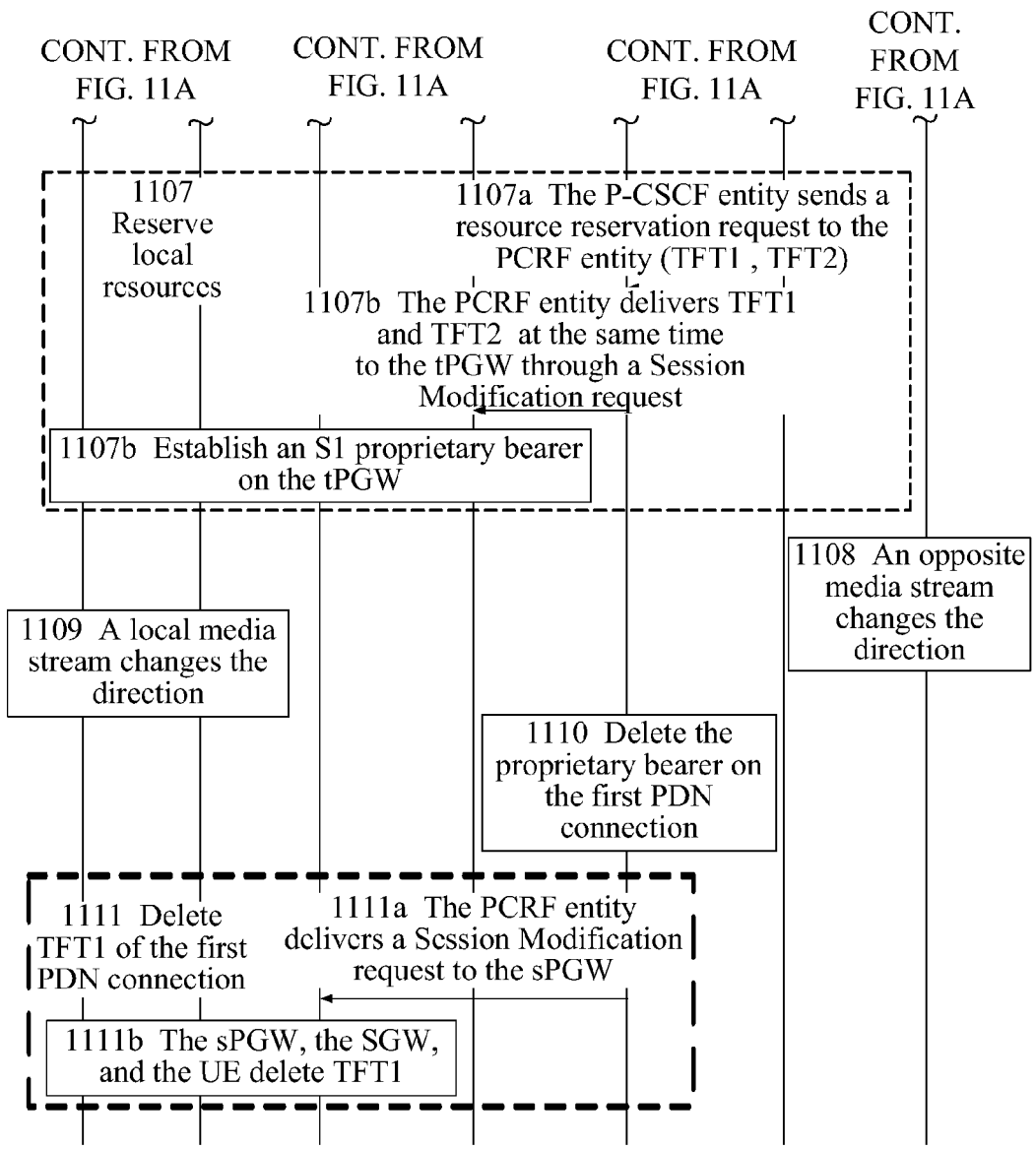

FIG. 11A and FIG. 11B are a flow chart of another embodiment of the method for traffic flows to share resources according to the present invention. In the embodiment, an IMS service example is taken to introduce the method for traffic flows to share resources in a service migration process. As shown in FIG. 11A and FIG. 11B, the embodiment includes:

Step 1101: A UE and an sPGW establish a first PDN connection, the sPGW allocates an IP address for the UE, and the IP address is called an IP address 1.

Step 1102: The UE establishes an IMS session, transfers traffic flows through the IP address 1, and the PCRF entity delivers corresponding TFT1 with respect to the IP address 1.

Step 1103: The UE and a tPGW establish a second PDN connection, the tPGW allocates an IP address for the UE, and the IP address is called an IP address 2.

Step 1104: The UE initiates IMS service migration, and makes a service on the IP address 1 migrate to the IP address 2.

Specifically, the UE sends a reINVITE message to a P-CSCF entity in an IMS network. The reINVITE message carries the IP address 2, and is used to change an IP address of a local traffic flow to the IP address 2.

Step 1105a: The P-CSCF entity sends a resource request to the PCRF entity. The resource request carries TFT2 corresponding to the IP address 2.

The P-CSCF entity is on a session path of the UE, so that the P-CSCF entity can obtain TFT1 information originally used by the UE and the relationship of TFT1 and TFT2 sharing the resources.

The P-CSCF entity sends a resource request to the PCRF entity. The resource request carries TFT1 corresponding to the IP address 1 and TFT2 corresponding to the IP address 2.

Step 1105b: The PCRF entity performs resource granting on the resource request.

TFT1 and TFT2 share the resources, so that the PCRF entity does not need to grant additional resources to TFT2.

Step 1105c: The PCRF entity sends a resource granting response to the P-CSCF entity.

Step 1106: Reserve opposite resources. Specifically the step includes:

Step 1106a: The P-CSCF entity forwards a reINVITE request to the network where an opposite UE is.

Step 1106b: The network, where the opposite UE is, performs resource reservation, and returns a response message, for example 200 OK.

Step 1107: Reserve local resources. Specifically the step includes:

Step 1107a: The P-CSCF entity sends a resource reservation request to the PCRF entity. The resource reservation request carries TFT1 corresponding to the IP address 1 and TFT2 corresponding to the IP address 2.

Step 1107b: The PCRF entity delivers TFT1 and TFT2 at the same time to the tPGW through a Session Modification request so as to establish an S1 proprietary bearer on the tPGW, and binds multiple traffic flows on the S1 proprietary bearer.

Then, the SGW obtains the resource request, and binds corresponding traffic flows for the S1 proprietary bearer. In the embodiment of the present invention, the employed method for the SGW to bind the traffic flows is the same as those described in the embodiments of the present invention shown by FIG. 2 to FIG. 5, and is not repeated here.

In this case, for the local UE, the local UE sends and receives uplink and downlink data packets through the sPGW.

Step 1108: An opposite media stream changes the direction, and for the local UE, the local UE receives the downlink data packet through the tPGW.

Step 1109: A local media stream changes the direction, and for the local UE, the local UE sends the uplink data packet through the tPGW.

During the execution of step 1107, step 1108, and step 1109 in the embodiment of the present invention, the S1 proprietary bearer of the data channel between the UE and the SGW can bear multiple traffic flows of different local IP addresses.

Step 1110: Delete the proprietary bearer on the first PDN connection.

Specifically, the PCRF entity may employ the method described in the embodiment of the present invention shown in FIG. 4 or FIG. 5 to delete the proprietary bearer of the first PDN connection, which is not repeated here.

Step 1111: Delete TFT1 of the first PDN connection.

Step 1111a: After the traffic flows are transferred, the PCRF entity delivers a Session Modification request to the sPGW, to request TFT1 of the first PDN connection to be deleted.

Step 1111b: The sPGW, the SGW, and the UE delete TFT1.

In the embodiment of the present invention, the AF binds the relationship of the IP address 1 and the IP address 2 sharing the resources, so it is achieved that in the IMS service migration process, multiple traffic flows of different IP addresses of the User Equipment are borne on the S1 proprietary bearer. Therefore, a network side apparatus does not need to allocate a new wireless bearer and S1 proprietary bearer for a traffic flow on a new IP address, thereby saving air interface resources.

Persons skilled in the art should understand that, all of or a part of the steps in the method according to the embodiments may be implemented by a program instructing relevant hardware. The program may be stored in a computer readable storage medium. When the program is run, the steps of the method according to the embodiments are performed. The storage medium may be any medium that is capable of storing program codes, such as a ROM, a RAM, a magnetic disk, and an optical disk.

Figure 12:
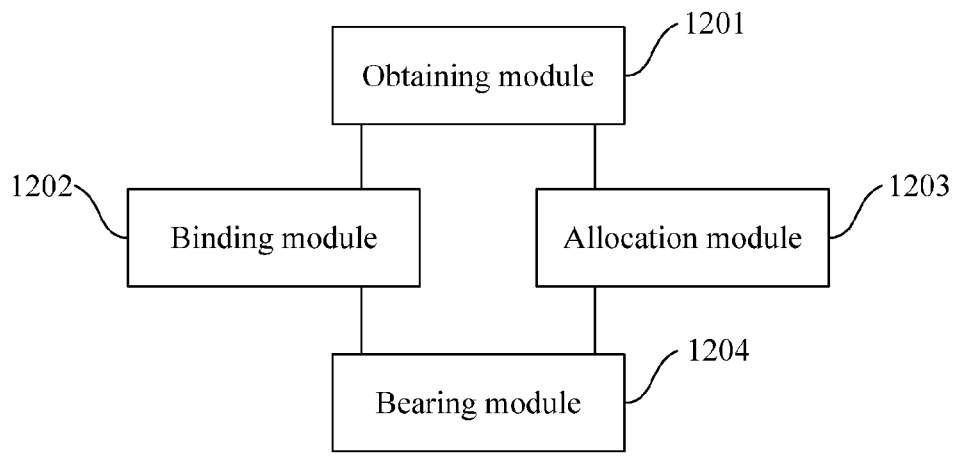
FIG. 12 is a schematic structural diagram of an embodiment of an access gateway according to the present invention.

An embodiment of the present invention provides an access gateway. FIG. 12 is a schematic structural diagram of an embodiment of an access gateway according to the present invention. The access gateway in the embodiment may implement the process in the embodiment of the present invention shown in FIG. 1. The access gateway may be an SGW in a 3GPP access situation, an access gateway in a Trusted non-3GPP access situation, or an ePDG in a Trusted non-3GPP access situation.

As shown in FIG. 12, the access gateway may include: an obtaining module 1201, a binding module 1202, an allocation module 1203, and a bearing module 1204.

Specifically, the obtaining module 1201 may obtain information of at least two traffic flows and resources requested by the at least two traffic flows. The at least two traffic flows correspond to different IP connections, and the at least two traffic flows share the resources. The binding module 1202 may bind the information, which is obtained by the obtaining module 1201, of the at least two traffic flows on the established data channel. The allocation module 1203 may allocate resources for the data channel according to the resources, which are obtained by the obtaining module 1201 and requested by the at least two traffic flows. The bearing module 1204 may bear the at least two traffic flows on the data channel.

The obtaining module 1201 may receive a resource request from a PCRF entity. The resource request includes the information of the at least two traffic flows corresponding to different IP addresses of a User Equipment, the resources requested by the at least two traffic flows, and a relationship of the at least two traffic flows sharing the resources. Alternatively, the obtaining module 1201 may receive a resource request of a PCRF entity, and the resource request includes information of one traffic flow of a User Equipment and resources requested by the traffic flow. The obtaining module 1201 generates the information of the at least two traffic flows corresponding to different IP addresses and the relationship of the at least two traffic flows sharing the resources according to the information of the traffic flow and a recorded relationship of different IP addresses of the User Equipment sharing a data channel; and obtains the resources requested by the at least two traffic flows according to the resources requested by the traffic flow.

In the embodiment, the obtaining module 1201 obtains the information of the at least two traffic flows and the resources requested by the at least two traffic flows. The binding module 1202 binds the information of the at least two traffic flows on the established data channel. The allocation module 1203 allocates the resources for the data channel according to the resources requested by the at least two traffic flows. The bearing module 1204 bears the at least two traffic flows on the data channel. The at least two traffic flows correspond to different IP connections, and share the resources. Therefore, it is achieved that multiple traffic flows corresponding to different IP connections access the same data channel, thereby saving air interface resources.

Figure 13:
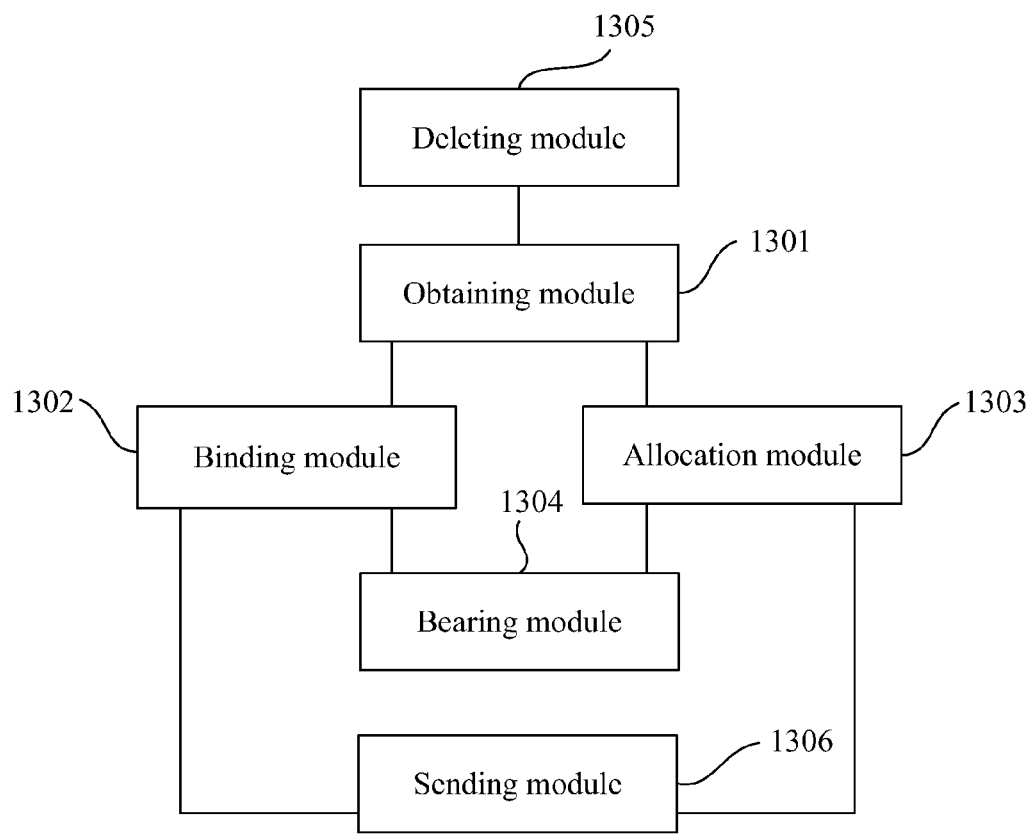
FIG. 13 is a schematic structural diagram of another embodiment of the access gateway according to the present invention.

FIG. 13 is a schematic structural diagram of another embodiment of the access gateway according to the present invention. The access gateway may be an SGW in a 3GPP access situation, an access gateway in a Trusted non-3GPP access situation, or an ePDG in a Trusted non-3GPP access situation.

As shown in FIG. 13, the access gateway may include: an obtaining module 1301, a binding module 1302, an allocation module 1303, a bearing module 1304, a deleting module 1305, and a sending module 1306.

Specifically, the obtaining module 1301 may obtain information of at least two traffic flows and resources requested by the at least two traffic flows. The at least two traffic flows correspond to different IP connections, and the at least two traffic flows share the resources. The binding module 1302 may bind the information, which is obtained by the obtaining module 1301, of the at least two traffic flows on the established data channel. The allocation module 1303 may allocate resources for the data channel according to the resources, which are obtained by the obtaining module 1301 and requested by the at least two traffic flows. The bearing module 1304 may bear the at least two traffic flows on the data channel.

The obtaining module 1301 may receive a resource request from a PCRF entity. The resource request includes the information of the at least two traffic flows corresponding to different IP addresses of a User Equipment, the resources requested by the at least two traffic flows, and a relationship of the at least two traffic flows sharing the resources. Alternatively, the obtaining module 1301 may receive a resource request of a PCRF entity, and the resource request includes information of one traffic flow of a User Equipment and resources requested by the traffic flow. The obtaining module 1301 generates the information of the at least two traffic flows corresponding to different IP addresses and the relationship of the at least two traffic flows sharing the resources according to the information of the traffic flow and a recorded relationship of different IP addresses of the User Equipment sharing a data channel; and obtains the resources requested by the at least two traffic flows according to the resources requested by the traffic flow.

The deleting module 1305 may receive a proprietary bearer deletion request. The deleting module 1305 maps information, which is carried in the proprietary bearer deletion request and is of the traffic flow required to be deleted, to the S1 proprietary bearer which is already established; and sends a bearer update request to a Mobility Management Entity, where the bearer update request carries information of an updated traffic flow after the information, of the traffic flow required to be deleted, is deleted, so that the Mobility Management Entity deletes, according to the bearer update request, the S1 proprietary bearer corresponding to the information of the traffic flow required to be deleted.

The deleting module 1305 may also receive an additional PDN connection deletion request. The additional PDN connection deletion request carries an APN and an LBI that are used for establishing the first PDN connection and the IP address required to be deleted. The deleting module 1305 deletes the first PDN connection according to the additional PDN connection deletion request.

The deleting module 1305 may also receive a session resource request sent by a PCRF entity. The session resource request includes information of the traffic flow required to be deleted. The deleting module 1305 maps the information, which is in the session resource request and is of the traffic flow required to be deleted, to the IPSec tunnel, deletes the information of the traffic flow required to be deleted, and sends a session resource response to the PCRF entity.

The deleting module 1305 may also receive an IP address deletion request. The IP address deletion request carries the IP address allocated for the User Equipment when the PGW establishes the first PDN connection. The deleting module 1305 sends a Proxy Binding Update message to the PGW according to the IP address deletion request, so that the PGW deletes the first PDN connection.

In the embodiment of the present invention, when the information of the at least two traffic flows does not have a corresponding data channel, the binding module 1302 establishes a data channel corresponding to information of any one traffic flow among the at least two traffic flows, and binds the information of the at least two traffic flows on the established data channel. Alternatively, when information of any one traffic flow among the information of the at least two traffic flows has a corresponding data channel, the binding module 1302 binds the information of the at least two traffic flows on the existing data channel.

The sending module 1306 may send a binding relationship bound in the binding module 1302 of the traffic flow information and the established data channel to the User Equipment, so that the User Equipment performs uplink data flow classification. The sending module 1306 may further send, to the access network, the resources allocated by the allocation module 1303 for the data channel, so that the access network performs resource reservation.

In the embodiment of the present invention, the data channel includes the S1 proprietary bearer or the IPSec tunnel. The resources requested by the traffic flows include the QCI or bandwidth. The information of the traffic flow may specifically be a TFT.

In the embodiment, the obtaining module 1301 obtains the information of the at least two traffic flows and the resources requested by the at least two traffic flows. The binding module 1302 binds the information of the at least two traffic flows on the established data channel. The allocation module 1303 allocates the resources for the data channel according to the resources requested by the at least two traffic flows. The bearing module 1304 bears the at least two traffic flows on the data channel. The at least two traffic flows correspond to different IP connections, and share the resources. Therefore, it is achieved that multiple traffic flows corresponding to different IP connections access the same data channel, thereby saving air interface resources.

Figure 14:
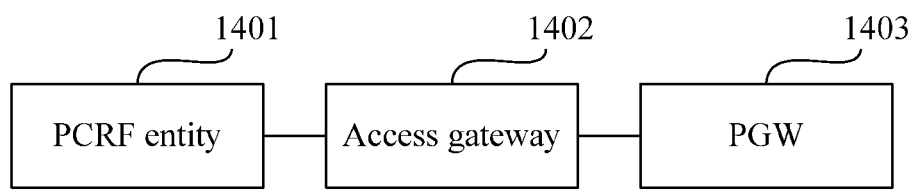
FIG. 14 is a schematic structural diagram of an embodiment of a system for traffic flows to share resources according to the present invention.

An embodiment of the present invention provides a system for traffic flows to share resources. FIG. 14 is a schematic structural diagram of an embodiment of a system for traffic flows to share resources according to the present invention. As shown in FIG. 14, the system for traffic flows to share resources includes a PCRF entity 1401, an access gateway 1402, and a PGW 1403.

The PCRF entity 1401 may send a resource request to the access gateway 1402.

The access gateway 1402 may receive the resource request sent by the PCRF entity 1401, obtain information of at least two traffic flows and resources requested by the at least two traffic flows, where the at least two traffic flows correspond to different IP connections, and the at least two traffic flows share the resources; bind the information of the at least two traffic flows on the established data channel, allocate resources for the data channel according to the resources requested by the at least two traffic flows; and bear the at least two traffic flows on the data channel.

When the resource request includes the information of the at least two traffic flows corresponding to different IP addresses of a User Equipment, the resources requested by the at least two traffic flows, and a relationship of the at least two traffic flows sharing the resources, the access gateway 1402 obtains the information of the at least two traffic flows corresponding to different IP addresses of the User Equipment, the resources requested by the at least two traffic flows, and the relationship of the at least two traffic flows sharing the resources from the resource request.

When the resource request includes the information of one traffic flow of the User Equipment and resources requested by the traffic flow, the access gateway 1402 generates the information of the at least two traffic flows corresponding to different IP addresses and the relationship of the at least two traffic flows sharing the resources according to the information of the traffic flow and a recorded relationship of different IP addresses of the User Equipment sharing a data channel; and obtains the resources requested by the at least two traffic flows according to the resources requested by the traffic flow.

When the User Equipment initiates service migration to make a traffic flow on an IP address of the User Equipment migrate to another IP address, the PCRF entity 1401 may determine, according to a binding relationship of different IP addresses of the User Equipment, that information of the traffic flow corresponding to one IP address of the User Equipment and information of the traffic flow corresponding to the another IP address share resources.

The PGW 1403 may receive an additional PDN connection creating request for establishing a second PDN connection, where the additional PDN connection creating request includes the APN and LBI that are used for establishing the first PDN connection; establish the second PDN connection according to the additional PDN connection creating request, where the first PDN connection and the second PDN connection share the wireless bearer and the S1 default bearer.

The access gateway 1402 may also receive an IP address re-application request for establishing the second PDN connection. The IP address re-application request includes the APN used for establishing the first PDN connection. The access gateway 1402 sends a Proxy Binding Update message to the PGW 1403 according to the IP address re-application request. The PGW 1403 that has received the Proxy Binding Update message may establish the second PDN connection according to the Proxy Binding Update message, where the first PDN connection and the second PDN connection share the IPSec tunnel.

If the information of the at least two traffic flows does not have a corresponding data channel, the access gateway 1402 establishes a data channel corresponding to information of any one traffic flow among the at least two traffic flows, and binds the information of the at least two traffic flows on the established data channel.

Alternatively, if information of any one traffic flow among the information of the at least two traffic flows has a corresponding data channel, the access gateway 1402 binds the information of the at least two traffic flows on the existing data channel.

In the embodiment of the present invention, the access gateway 1402 may be an SGW in a 3GPP access situation, an access gateway in a Trusted non-3GPP access situation, or an ePDG in a Trusted non-3GPP access situation. Specifically, the access gateway 1402 may be implemented through the access gateway of the present invention shown in FIG. 12 or FIG. 13.

The embodiments of the present invention provide a method, a system, and an access gateway for traffic flows to share resources. Information of at least two traffic flows corresponding to different IP connections are bound on the same data channel, so that during resource reservation, the problems of repeated occupation of air interface resources and the failure of the resource reservation caused by insufficient air interface resources are avoided, and during service migration, the problem of the failure of resource granting by the PCRF entity or repeated occupation of the resources is solved.

It should be understood by persons skilled in the art that the accompanying drawings are merely schematic diagrams of an exemplary embodiment, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further divided into a plurality of sub-modules.

Finally, it should be noted that the above embodiments are merely provided for describing the technical solutions of the present invention, but not intended to limit the present invention. It should be understood by persons skilled in the art that although the present invention has been described in detail with reference to the exemplary embodiments, modifications and equivalent replacements may be made to the technical solutions of the present invention, and such modifications or replacements do not cause the modified technical solutions to depart from the spirit and protection scope of the present invention.

What is claimed is:

1. A method for traffic flows to share resources, comprising:

obtaining information related to a plurality of traffic flows and resources requested by the traffic flows, wherein the traffic flows correspond to different Internet Protocol (IP) connections and the traffic flows share the resources;

binding the information of the traffic flows on an established data channel;

allocating resources for the data channel according to the resources requested by the traffic flows; and bearing the traffic flows on the data channel; the bearing comprising sharing, by a Packet Data Network (PDN) connections corresponding to the traffic flows, a wireless bearer and an S1 default bearer, the sharing comprising receiving an additional PDN connection creating request for establishing a second PDN connection, wherein the additional PDN connection creating request comprises an Access Point Name (APN) and a Linked Bearer Identity (LBI) which are used for establishing a first PDN connection, and sending the additional PDN connection creating request for establishing the second PDN connection to a Packet Data Gateway (PGW) so that the PGW establishes the second PDN connection according to the additional PDN connection creating request, wherein the first PDN connection and the second PDN connection share the wireless bearer and the S1 default bearer;

receiving an additional PDN connection deletion request, wherein the additional PDN connection deletion request carries the APN and LBI that are used for establishing the first PDN connection and an IP address required to be deleted; and deleting the first PDN connection according to the additional PDN connection deletion request.

2. The method according to claim 1, wherein obtaining the information comprises:

receiving a resource request from a Policy Charging Rule Function (PCRF) entity, wherein the resource request comprises the information related to the traffic flows, which correspond to different IP addresses of a User Equipment, to the resources requested by the traffic flows, and to a relationship of the traffic flows sharing the resources; or receiving a resource request from a PCRF entity, wherein the resource request comprises information related to a traffic flow of a User Equipment and resources requested by the traffic flow and generating the information related to the traffic flows, which correspond to different IP addresses and to the relationship of the traffic flows sharing the resources according to the information of the traffic flow and a recorded relationship of different IP addresses of the User Equipment sharing a data channel and obtaining the resources requested by the traffic flows according to the resources requested by the traffic flow.

3. The method according to claim 2, further comprising: when the User Equipment initiates service migration to make a traffic flow on an IP address of the User Equipment migrate to another IP address, determining, by the PCRF entity, according to a recorded binding relationship of different IP addresses of the User Equipment, that information of a traffic flow corresponding to the IP address of the User Equipment and information of a traffic flow corresponding to the another IP address share resources.

4. The method according to claim 1, further comprising: receiving a proprietary bearer deletion request;

mapping information, carried in the proprietary bearer deletion request, related to a traffic flow required to be deleted to an S1 proprietary bearer that is already established; and sending a bearer update request to a Mobility Management Entity, wherein the bearer update request carries information of an updated traffic flow after the information of the traffic flow required to be deleted is deleted, so that the Mobility Management Entity deletes, according to the bearer update request, an S1 proprietary bearer corresponding to the information of the traffic flow required to be deleted.

5. The method according to claim 1, wherein binding the information of the traffic flows on the established data channel comprises:

if the information of the traffic flows does not have a corresponding data channel, establishing a data channel corresponding to information of any one traffic flow among the traffic flows and binding the information of the traffic flows on the established data channel; and if information of any one traffic flow among the information of the traffic flows has a corresponding data channel, binding the information of the traffic flows on the existing data channel.

6. The method according to claim 1, further comprising sending a binding relationship between the information of the traffic flow and the established data channel to the User Equipment, so that the User Equipment performs uplink data flow classification.

7. The method according to claim 1, wherein bearing the traffic flows on the data channel comprises sharing, by a Packet Data Network (PDN), connections corresponding to the traffic flows and an Internet Protocol Security (IPSec) tunnel.

8. The method according to claim 7, wherein sharing the IPSec tunnel comprises:

receiving an IP address re-application request for establishing a second PDN connection, wherein the IP address re-application request comprises an APN for establishing a first PDN connection; and sending a Proxy Binding Update message to a PGW so that the PGW establishes the second PDN connection according to the Proxy Binding Update message, wherein the first PDN connection and the second PDN connection share the IPSec tunnel.

9. The method according to claim 8, further comprising: receiving a session resource request sent by a PCRF entity, wherein the session resource request comprises information of a traffic flow required to be deleted;

mapping the information, in the session resource request, related to the traffic flow required to be deleted to the IPSec tunnel; and deleting the information of the traffic flow required to be deleted.

10. The method according to claim 8, further comprising: receiving an IP address deletion request, wherein the IP address deletion request carries an IP address which is allocated for a User Equipment when the PGW establishes the first PDN connection; and sending a Proxy Binding Update message to the PGW, so that the PGW deletes the first PDN connection.

11. An access gateway, comprising:

an obtaining module, configured to obtain information related to a plurality of traffic flows and resources requested by the traffic flows, wherein the traffic flows correspond to different Internet Protocol (IP) connections and the traffic flows share the resources, configured to receive a resource request from a Policy Charging Rule Function (PCRF) entity and wherein the resource request comprises the information related to the traffic flows, the information corresponding to different IP addresses of a User Equipment, the request also comprising the resources requested by the traffic flows and a relationship of the traffic flows sharing the resources, and configured to receive a resource request from a PCRF entity, the resource request comprising information of a traffic flow of a User Equipment and resources requested by the traffic flow to generate the information of the traffic flows corresponding to different IP addresses and the relationship of the traffic flows sharing the resources according to the information of the traffic flow and a recorded relationship of different IP addresses of the User Equipment sharing a data channel and to obtain the resources requested by the traffic flows according to the resources requested by the traffic flow;
a binding module, configured to bind the information obtained by the obtaining module on an established data channel;
an allocation module, configured to allocate resources for the data channel according to the resources obtained by the obtaining module and requested by the traffic flows;
a bearing module, configured to bear the traffic flows on the data channel; and
a deleting module, configured to map information, which is carried in a proprietary bearer deletion request and is of a traffic flow required to be deleted, to an S1 proprietary bearer which is already established; and to send a bearer update request to a Mobility Management Entity, wherein the bearer update request carries information of an updated traffic flow after the information, of the traffic flow required to be deleted, is deleted, so that the Mobility Management Entity deletes, according to the bearer update request, the S1 proprietary bearer corresponding to the information of the traffic flow required to be deleted; or
configured to map the information, in a received session resource request sent by the PCRF entity, of the traffic flow required to be deleted to an IPSec tunnel, and to delete the information of the traffic flow required to be deleted.

12. The access gateway according to claim 11, wherein the deleting module is further configured to delete a first PDN connection according to an APN and an LBI, which are carried in a received additional PDN connection deletion request and used for establishing the first PDN connection; or
the deleting module is further configured to obtain an IP address, which is comprised in an IP address deletion request and allocated to a User Equipment when a PGW establishes the first PDN connection; and to send a Proxy Binding Update message to the PGW, so that the PGW deletes the first PDN connection.

13. The access gateway according to claim 11, wherein if the information of the traffic flows does not have a corresponding data channel, the binding module is configured to establish a data channel corresponding to information of any one traffic flow among the traffic flows, and to bind the information of the traffic flows on the established data channel; and
if information of any one traffic flow among the information of the traffic flows has a corresponding data channel, the binding module is configured to bind the information of the traffic flows on the existing data channel.

14. The access gateway according to claim 11, further comprising:
a sending module, configured to send a binding relationship between the information of the traffic flow and the established data channel to the User Equipment, so that the User Equipment performs uplink data flow classification.

15. A system for traffic flows to share resources, comprising:
a Policy Charging Rule Function entity; and
an access gateway;
wherein the Policy Charging Rule Function entity is configured to send a resource request to the access gateway; and
the access gateway is configured to receive the resource request sent by the Policy Charging Rule Function entity, and to obtain information of a plurality of traffic flows and resources requested by the traffic flows, wherein the traffic flows correspond to different Internet Protocol (IP) connections, and the traffic flows share the resources, to bind the information of the traffic flows on the established data channel, to allocate resources for the data channel according to the resources requested by the traffic flows; and to bear the traffic flows on the data channel;
wherein when the resource request comprises information of the traffic flows corresponding to different IP addresses of a User Equipment, the resources requested by the traffic flows, and a relationship of the traffic flows sharing the resources, the access gateway is configured to obtain, from the resource request, the information of the traffic flows corresponding to the different IP addresses of the User Equipment, the resources requested by the traffic flows, and a relationship of the traffic flows sharing the resources; or
when the resource request comprises information of a traffic flow of the User Equipment and resources requested by the traffic flow, the access gateway is configured to generate the information of the traffic flows corresponding to different IP addresses and the relationship of the traffic flows sharing the resources according to the information of the traffic flow and a recorded relationship of different IP addresses of the User Equipment sharing a data channel; and to obtain the resources requested by the traffic flows according to the resources requested by the traffic flow; and
wherein when the User Equipment initiates service migration to make a traffic flow on an IP address of the User Equipment migrate to another IP address, the Policy Charging Rule Function entity determines, according to a recorded binding relationship of different IP addresses of the User Equipment, that information of a traffic flow corresponding to the IP address of the User Equipment and information of a traffic flow corresponding to the another IP address share resources.

16. The system according to claim 15, further comprising:
a Packet Data Gateway (PGW) configured to receive an additional PDN connection creating request for establishing a second PDN connection, wherein the additional PDN connection creating request comprises an Access Point Name (APN) and a Linked Bearer Identity (LBI) that are used to establish a first PDN connection; and to establish a second PDN connection according to the additional PDN connection creating request, wherein the first PDN connection and the second PDN connection share a wireless bearer and an S1 default bearer.

17. The system according to claim 15, wherein the access gateway is further configured to receive an IP address re-application request for establishing a second PDN connection, wherein the IP address re-application request comprises an APN for establishing a first PDN connection; the access gateway is configured to send a Proxy Binding Update message to a PGW according to the IP address re-application request, so that the PGW establishes the second PDN connection according to the Proxy Binding Update message, wherein the first PDN connection and the second PDN connection share an IPSec tunnel.

18. The system according to claim 15, wherein
if the information of the traffic flows does not have a corresponding data channel, the access gateway is configured to establish a data channel corresponding to information of any one traffic flow among the traffic flows, and to bind the information of the traffic flows on the established data channel; and if information of any one traffic flow among the information of the two traffic flows has a corresponding data channel, the access gateway is configured to bind the information of the traffic flows on the existing data channel.

* * * * *